United States Patent [19]
Akkary et al.

[11] Patent Number: 5,526,510
[45] Date of Patent: Jun. 11, 1996

[54] METHOD AND APPARATUS FOR IMPLEMENTING A SINGLE CLOCK CYCLE LINE REPLACEMENT IN A DATA CACHE UNIT

[75] Inventors: Haitham Akkary, Portland; Mandar S. Joshi, Aloha; Rob Murray; Brent E. Lince, both of Hillsboro; Paul D. Madland, Beaverton; Andrew F. Glew, Hillsboro; Glenn J. Hinton, Portland, all of Oreg.

[73] Assignee: Intel Corporation, Santa Clara, Calif.

[21] Appl. No.: 315,889

[22] Filed: Sep. 30, 1994

Related U.S. Application Data

[63] Continuation-in-part of Ser. No. 202,448, Feb. 28, 1994.

[51] Int. Cl.$^6$ .................................................. G06F 12/08
[52] U.S. Cl. ...................... 395/460; 395/453; 395/470; 395/482; 395/877; 364/DIG. 1; 364/243.41; 364/239.6
[58] Field of Search ........................... 364/200 MS File, 364/900 MS File; 395/453, 460, 470, 473, 482, 486, 492, 877

[56] References Cited

U.S. PATENT DOCUMENTS

| | | | |
|---|---|---|---|
| 4,905,188 | 2/1990 | Chuang | 395/455 |
| 5,031,141 | 7/1991 | Guddat et al. | 365/49 |
| 5,197,144 | 3/1993 | Edenfield et al. | 395/470 |
| 5,283,890 | 2/1994 | Petolino, Jr. et al. | 395/449 |
| 5,355,467 | 10/1994 | MacWilliams et al. | 395/473 |
| 5,371,870 | 12/1994 | Goodwin et al. | 395/872 |
| 5,388,224 | 2/1995 | Maskas | 395/284 |

OTHER PUBLICATIONS

Kunio Ochiyama, *RISC pipeline draws on cache memory*, Electronics Engineering Times, Jan. 24, 1994, p. 42.
Matt Gutierrez, *Multiprocessors cache in*, Electronic Engineering Times, Nov. 18, 1991, p. 80.
"The Metaflow Architecture", pp. 10–13 and 63–73, by Val Popescu, Merle Schultz, John Spracklen, Gary Gibson, Bruce Lightner, and David Isaman, IEEE Micro, 1991.

*Primary Examiner*—Matthew M. Kim
*Attorney, Agent, or Firm*—Blakely, Sokoloff, Taylor & Zafman

[57] ABSTRACT

The data cache unit includes a separate fill buffer and a separate write-back buffer. The fill buffer stores one or more cache lines for transference into data cache banks of the data cache unit. The write-back buffer stores a single cache line evicted from the data cache banks prior to write-back to main memory. Circuitry is provided for transferring a cache line from the fill buffer into the data cache banks while simultaneously transferring a victim cache line from the data cache banks into the write-back buffer. Such allows the overall replace operation to be performed in only a single clock cycle. In a particular implementation, the data cache unit is employed within a microprocessor capable of speculative and out-of-order processing of memory instructions. Moreover, the microprocessor is incorporated within a multiprocessor computer system wherein each microprocessor is capable of snooping the cache lines of data cache units of each other microprocessor. The data cache unit is also a non-blocking cache.

12 Claims, 17 Drawing Sheets

DCU(20)

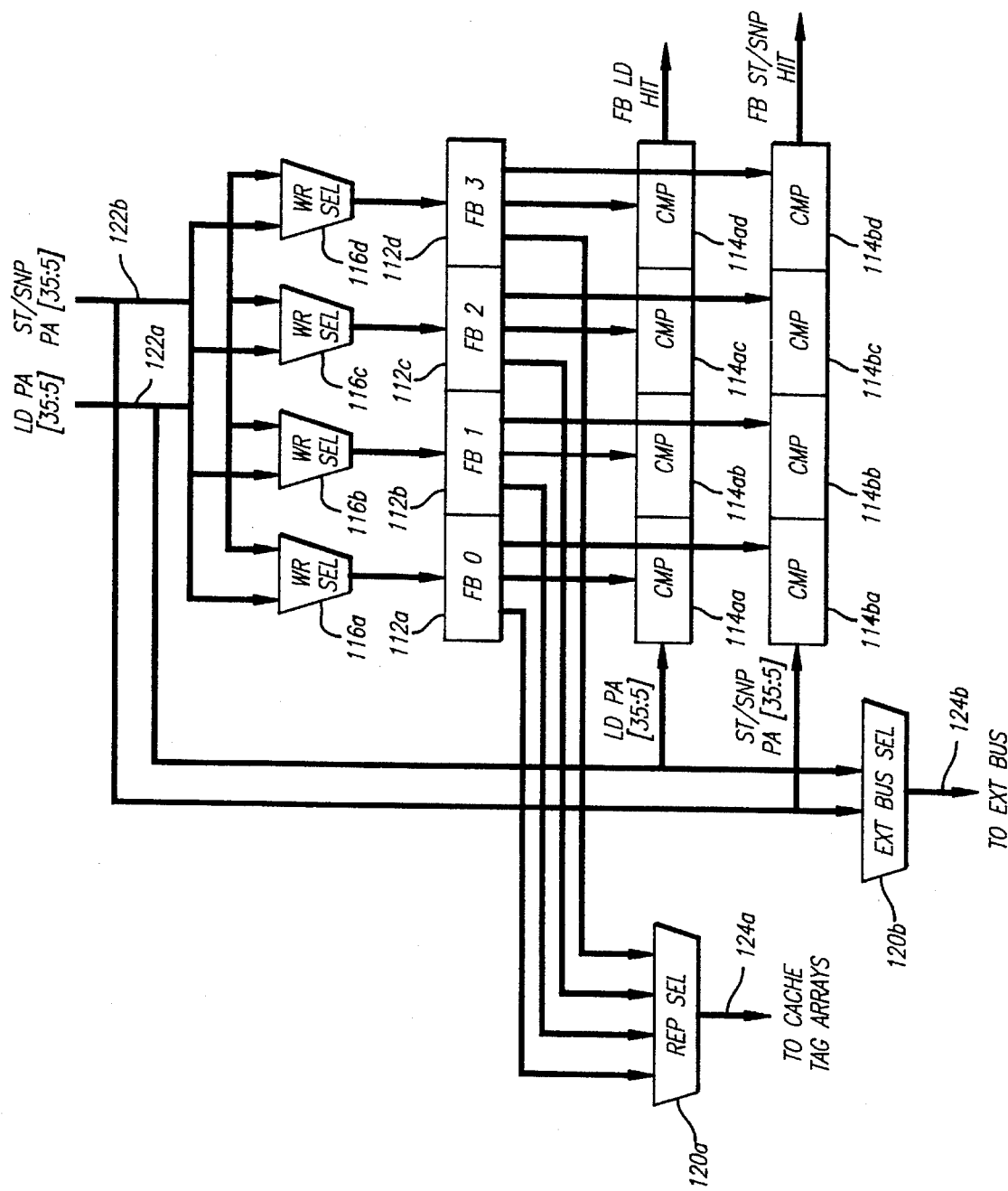

METHOD AND APPARATUS FOR IMPLEMENTING A SINGLE CLOCK CYCLE LINE REPLACEMENT IN A DATA CACHE UNIT

BACKGROUND OF THE INVENTION

1. Related Applications

This is a continuation-in-part application of pending U.S. patent application Ser. No. 08/202,448 filed Feb. 28, 1994. Other related U.S. patent applications include application Ser. No. 08/483,285 filed Jun. 7, 1995 which is a continuation of application Ser. No. 08/177,250 filed Jan. 4, 1994, now abandoned; pending application Ser. No. 08/176,111 filed Dec. 30, 1993; and pending application Ser. No. 08/202,445 filed Feb. 28, 1994.

2. Field of the Invention

The invention generally relates to the field of computer systems and more specifically to cache subsystems.

3. Description of Related Art

Conventional computer systems typically employ cache subsystems such as a data cache unit (DCU) or an instruction cache unit (ICU) for expediting read and write operations to main memory from a central processing unit (CPU). Read and write operations are also know as load and store operations, respectively. In the following, general principles of a DCU will be described. However, many of the same principles are also applicable to an ICU.

A DCU stores data and addresses for the most recently accessed memory addresses. A read operation issued from the CPU to the main memory is first processed by the DCU to determine if the required data is already stored therein. If so, a cache "hit" is said to have occurred and the data found within the DCU is merely transferred to the CPU directly thereby saving considerable time otherwise required to access the main memory. If the required data is not found within the DCU, a cache "miss" is said to have occurred and the DCU forwards the read request via a system bus to the main memory for retrieving the requested data. Write operations are processed in much the same manner.

A wide variety of cache architectures and protocols have been developed which further refine and exploit the general cache concept. Examples are described in the Cache Memory Book by Jim Handy, Academic Press Inc., 1993. One exemplary DCU protocol is a "write-through" protocol wherein data to be written to main memory is stored in the DCU and immediately written to main memory. Although the write-through protocol expedites data read operations by caching the most recently accessed memory locations within the DCU, the write-through protocol does not expedite write operations since each individual write to the DCU also requires a separate write to main memory. An alternative protocol is a "write-back" protocol wherein data to be written to main memory is first written to the DCU where it is held pending a subsequent write operation to main memory, perhaps in a burst mode, along with other data to be written. By not requiring each individual write to be immediately written to memory, and instead allowing writes to be performed in a more efficient manner overall write time required by the system is improved. However, as can be appreciated, care must be taken to ensure that the data stored in memory that is to be over-written by write-back data is not accessed directly from the main memory before the write-back operation occurs.

As noted, a conventional write-through protocol does not improve the effective main memory write cycle. To improve main memory write efficiency, write buffers have been proposed for use with write-through DCUs. The CPU writes the data both to cache banks of the DCU and to the write buffer, thereby allowing the CPU to immediately process other information rather than to wait for processing of the main memory write through the system bus. Hence, although the overall write cycle time may be delayed as a result of system bus latency, such delays are isolated form the CPU and thereby do not affect CPU performance.

Write buffers have also been proposed for use with DCUs employing the write-back protocol for expediting memory read operations. In the context of write-back protocol DCUs, the write buffer is also commonly called a write-back buffer. With the write-back protocol, before new data can be read from memory and placed within the DCU, a previous cache line containing data not yet written-back to main memory must first be evicted from the cache. In a simple write-back DCU implementation, the main memory read is deferred until after a line is evicted from the cache, resulting in a delay in the read operation. To expedite read operations, the write-back buffer is employed for storing the evicted line prior to write-back. In such an implementation, upon a read miss operation, the DCU promptly evicts one cache line to the write-back buffer, while also dispatching the main memory read operation to main memory such that data retrieved in response to the read operation can be stored within the now empty cache line. Such an implementation is commonly referred to as a "concurrent line write-back". In an alternative implementation, referred to as a "buffered line fill", a fill buffer (also known as a line buffer) rather than a write-back buffer is provided. Data read from main memory is first stored within the fill buffer from which the CPU has prompt access thereby satisfying the CPU's immediate requirements for the data. Thereafter, a line to be evicted from the cache is written back to main memory, thereby freeing up a line within the cache for receiving the replacement line. After the evicted data is written back to main memory, the replacement line within the fill buffer is written into the now empty cache line.

Although the aforementioned use of either a write-buffer or a fill buffer within DCUs has improved DCU performance, considerable room for further improvement remains. In particular, within either a write-through DCU or a write-back DCU, coherency problems can occur as a result of the latency between transference of data between the cache lines and the write-back buffer or the fill buffer. Such is a particular problem within multiprocessor environments wherein each processor is capable of snooping the data held within the DCU of other microprocessors. To ensure coherency, the actual implementation of write-back buffers or fill buffers within DCUs can be quite complicated requiring extra circuitry which result in time delays causing a forfeiture of some of the processing gains theoretically achievable within a DCU.

Further complexity occurs within microprocessor systems capable of speculative or out-of-order processing. In an out-of-order microprocessor, memory access operations may be issued by the CPU in an order other than which is defined by a software program. Out-of-order issuing of memory access instructions maybe employed to enhance overall processor efficiency by exploiting any parallel processing capabilities of the CPU. When memory access operations are issued out-of-order, it may be necessary to hold one or more of the operations in abeyance pending execution of other, later-issued, operations. For example, the execution of a memory access operation may require deferral until the resolution of a branch condition, such as and "IF" statement.

In a microprocessor architecture capable of speculative processing, further efficiency is gained by performing a branch prediction upon the occurence of any unresolved branch condition. Branch prediction allows commands subsequent to the branch to be speculatively processed pending resolution of the branch condition. In other words, for each branch condition the microprocessor predicts which branch is to be taken, then executes subsequent instructions speculatively. The ability to execute commands speculatively further exploits any parallel processing capability of the system by allowing at least some commands which depend upon a branch condition to be performed prior to actual resolution of the branch condition. General aspects of out-of-order and speculative processing are described in "Super Scalar Microprocessor Design" by Mike Johnson, Prentiss-Hall, Inc., 1991.

As can be appreciated, numerous limitations exist as to which commands or instructions can be performed out-of-order and which can be performed speculatively. One possible limitation to the execution of instructions and commands is that actual memory accesses to main memory may require deferral until the execution of prior instructions or until the resolution of prior branch conditions. For example, it may be undesirable to perform a read from main memory based on a speculative read operation if the speculative read accesses memory mapped I/O as such can result in non-recoverable side-effects. Within speculative or out-of-order systems, the DCU should be implemented such that speculative read or write operations are not forwarded to main memory.

It would be desirable to implement a more efficient DCU, particularly within a multiprocessor computer system wherein each processor is capable of speculative and out-of-order execution of operations and wherein each microprocessor is capable of snooping the DCU's of other microprocessors. It is to that end that certain aspects of the invention are drawn.

SUMMARY OF THE INVENTION

In accordance with one aspect of the invention an improved cache subsystem such as a DCU is provided within a computer system. The DCU includes a fill buffer for storing data retrieved from an external source, such as a main memory, in response to a cache miss and also includes a separate write-back buffer for storing a victim cache line subject to eviction. The DCU is also capable of transferring a victim line from cache bank of the DCU to the write-back buffer while, in the same clock cycle, replacing the victim line in the cache banks with a replacement line from the fill buffer.

By providing both a fill buffer and a write-back buffer within the DCU, the advantages of both are advantageously achieved. Furthermore, by moving a victim line from the DCU to the write-back buffer while simultaneously replacing the victim line in the cache with the fill buffer, coherency problems associated with any latency between cache line transfers is eliminated. Moreover, overall processing efficiency is enhanced because only a single clock cycle is required to complete both operations.

In an exemplary implementation, the DCU includes a set of four cache banks with portions of each cache line stored in each cache bank. Only a single operation may be performed within each cache bank within each clock cycle. Accordingly, the cache line replacement cannot be performed during any clock cycle wherein an operation is performed on any of the other cache lines within the cache banks. Also in the exemplary implementation, the DCU is employed within microprocessors of a multi-processor system wherein each microprocessor is capable of out of order and speculative processing of instructions and wherein each microprocessor is capable of snooping the cache lines of the DCUs of the other microprocessors.

A method for replacing a cache line within the DCU of the exemplary implementation is also provided. In accordance with the method, the DCU determines whether the write-back buffer is full and, if so, further processing is deferred until a line within the write-back buffer is written back to main memory. Once the write-back buffer is no longer full, the DCU determines whether a read or write operation is pending on any line within any of the data cache banks. If a read or write is pending, the DCU determines whether the fill buffer is full and, if full, aborts the pending read or write operation to allow the replace operation to proceed instead. If not full, the DCU waits for a next available clock cycle when no read or write is pending on any of the cache banks. Thereafter, the DCU identifies a victim cache line to be evicted, then determines whether the victim line is subject to a pending snoop operation and if so, the replacement operation is aborted, then reattempted. If a snoop operation is not pending on the victim cache line, the DCU moves the victim cache line to the write-back buffer while, in the same clock cycle, moving a cache line from the fill buffer to the now empty cache line within the cache banks. Thereafter, the victim cache line is evicted from the write-back buffer to main memory, perhaps under a burst mode data transfer.

The thus described method provides for a particularly efficient overall replacement operation which exploits the separate write-back buffer and the separate fill buffer and further exploits the capability of the DCU to transfer a victim cache line into the write-back buffer line while simultaneously transferring data from the fill buffer into the victim cache line. In this manner, only a single clock cycle is required for the overall replacement operation. Hence, overall read and write efficiency is enhanced while further simplifying the avoidance of cache coherency problems. As such, the general objectives set forth above are achieved. Other advantages and objectives of the invention will be apparent from the detailed description which follows.

BRIEF DESCRIPTION OF THE DRAWINGS

FIGS. 7a–7b illustrate relevant portions of one embodiment of the fill buffers of FIGS. 6a–6b in further detail from the address and data path views.

DETAILED DESCRIPTION OF EXEMPLARY EMBODIMENTS

Figure 1:
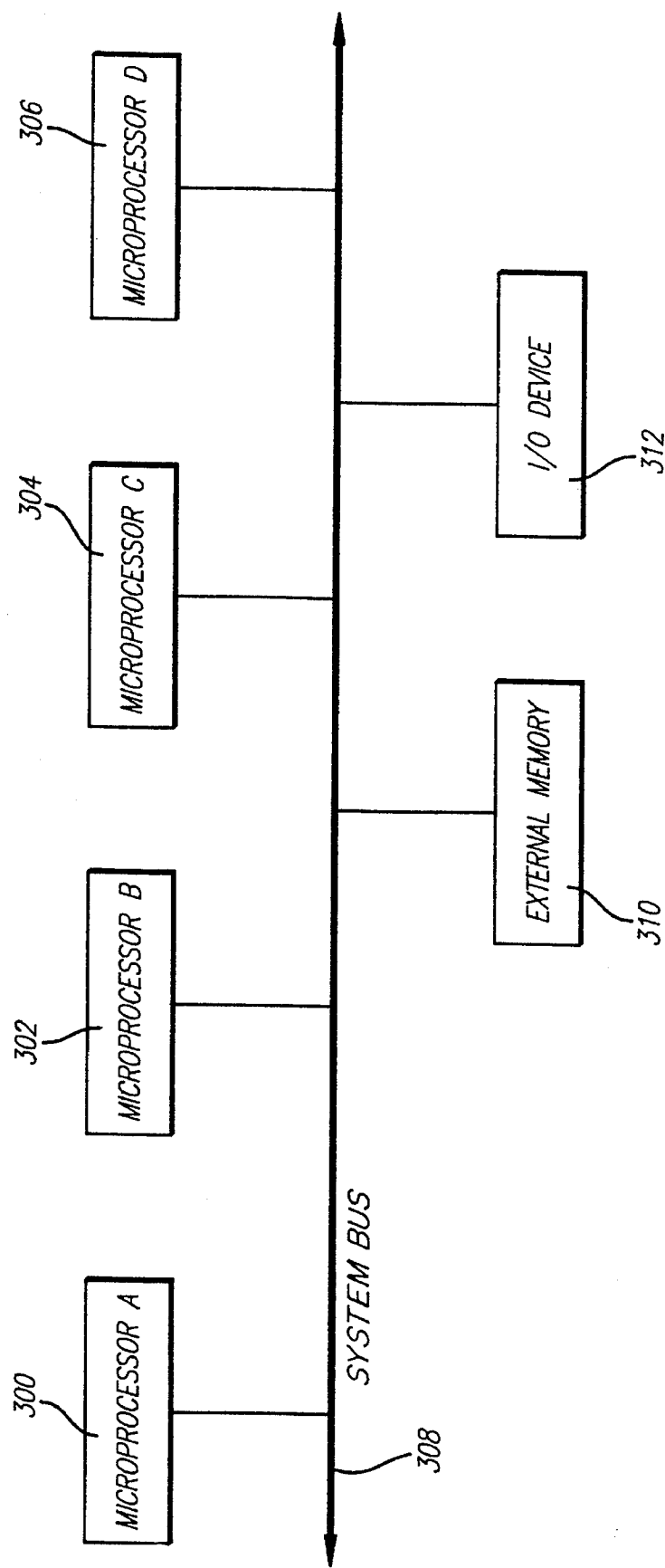
FIG. 1 is a block diagram illustrating a computer system having multiple microprocessors, each configured to incorporate aspects of the invention.
Figure 2:
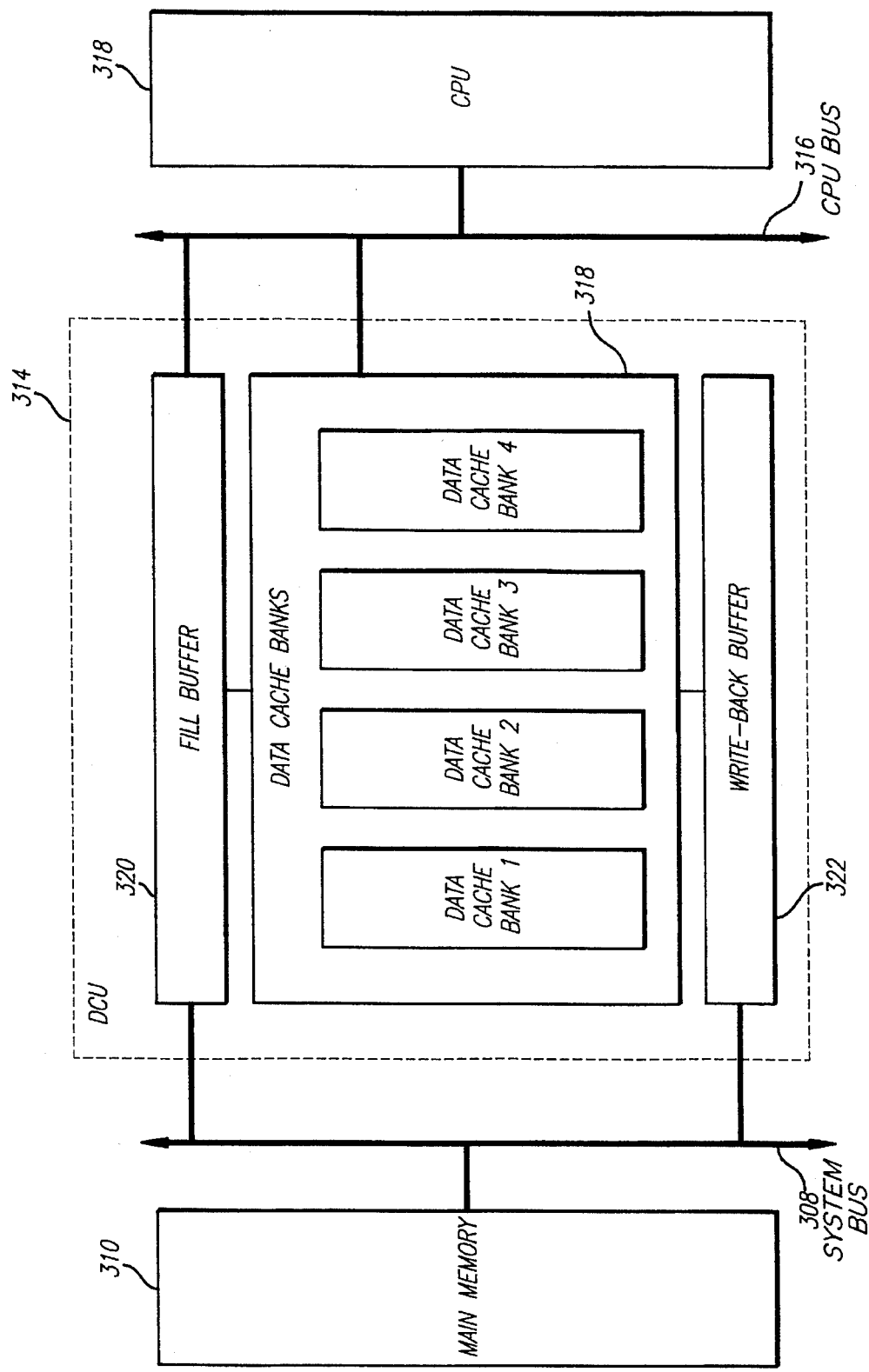
FIG. 2 is a block diagram illustrating a DCU of one of the microprocessors of FIG. 1.
Figure 3:
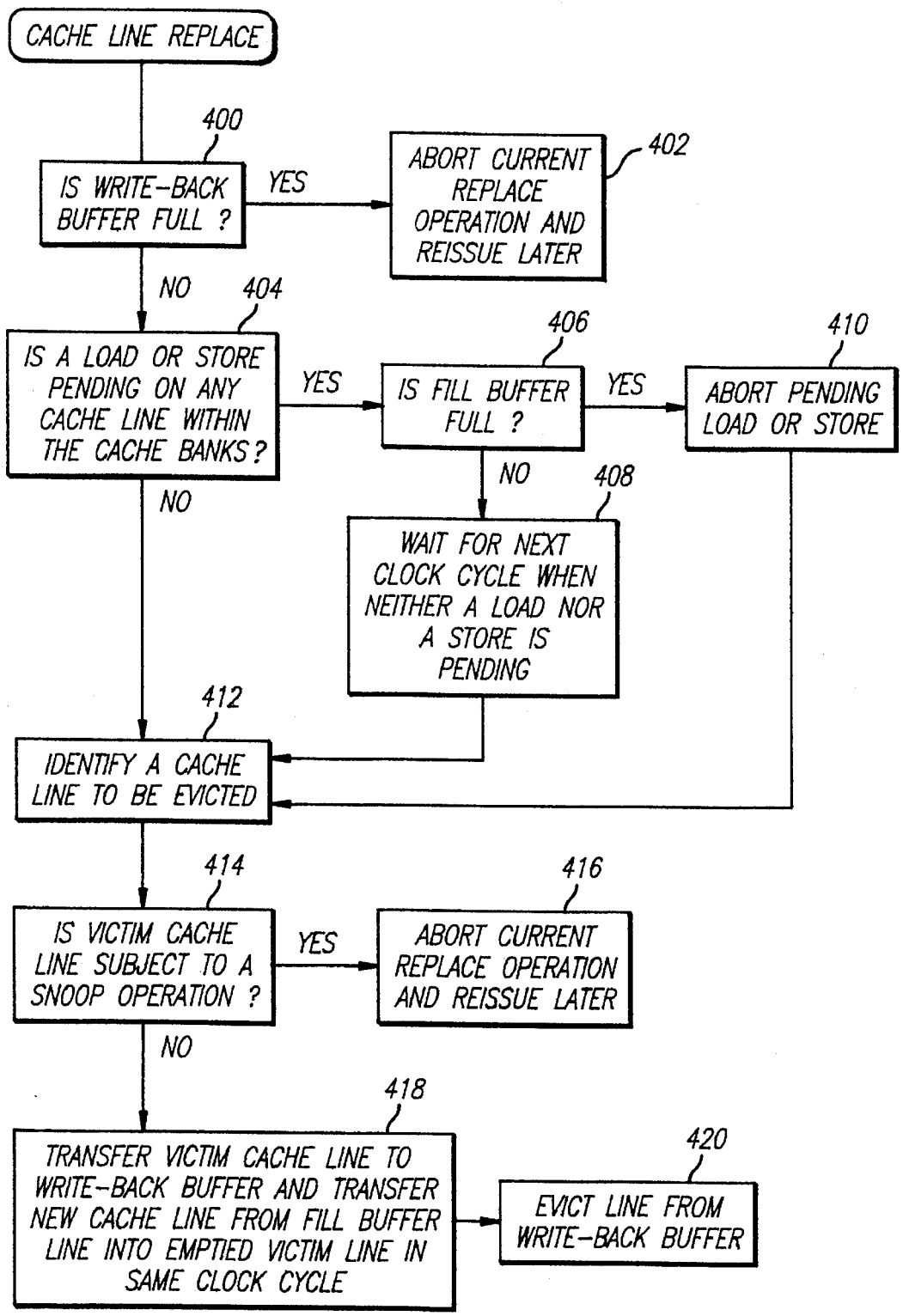
FIG. 3 is a flow chart illustrating a method for replacing cache lines within the DCU of FIG. 2.

With reference to FIGS. 1–3, an overview of the invention will be provided. Then, with reference to the remaining Figures, a particular exemplary implementation of the invention will be set forth in detail. For ease of explanation, unless otherwise stated, the terms data read and write operations in the description to follow refer to memory data read and write operations and are synonymous with load and store operations.

OVERVIEW

FIG. 1 illustrates a multiprocessor computer system having four individual microprocessors, 300, 302, 304 and 306 interconnected by a system bus 308. A main memory 310 and an input/output device 312 are also connected to system bus 308. Main memory 310 may include a wide range of memory storage units including ROMs, RAMS and the like. I/O device 312 may include any of a number of input or output devices such as keyboards, CRT displays, and the like. Each of the microprocessors illustrated in FIG. 1 may be identical. As will be described more fully below, each microprocessor incorporates a DCU having a separate fill buffer and a separate write-back buffer and configured to efficiently transfer cache lines from the fill buffer into the cache banks of the DCU while simultaneously transferring an evicted cache line into the write-back buffer. Each of the microprocessors is also capable of the speculative and out-of-order execution of instructions. Moreover, each is capable of snooping the cache lines of each of the other microprocessors.

FIG. 2 illustrates relevant portions of microprocessor 300 of FIG. 1 while also illustrating system bus 308 and main memory 310. The only portions of microprocessor 300 specifically illustrated in FIG. 2 is a DCU 314, a CPU bus 316 and a CPU 318. DCU 314 includes four data cache banks generally denoted 318, a fill buffer 320 and a write-back buffer 322. One fourth of each individual cache line stored within DCU 314 is stored within each of the four cache banks. In other words, an entire cache line covers all four cache banks. Only a single operation, such as a load or store, may be performed within each cache bank 318 at any one time.

As can be appreciated, microprocessor 300 of FIG. 2 may be provided with a wide range of additional components, many of which will be described with respect to the exemplary embodiment illustrated in FIGS. 4–13. Moreover, although DCU 314 is illustrated as being separate from CPU 316, DCU 314 may also be considered simply as one of the components of CPU 316.

In use, a read request for retrieving data from main memory 310 is first transferred through CPU bus 316 to DCU 314 which accesses the cache lines of cache banks 318 to determine if the data corresponding to the address specified in the read request is already stored therein. If not, DCU 314 forwards the read request through system bus 308 to memory 310 which returns the requested data. In the implementations described herein, an entire cache line containing the requested data is returned, rather than only the requested data. The cache line is initially stored by DCU 314 in fill buffer 320. Thereafter, the cache line is transferred into cache banks 318. In the event that there are no empty cache lines within the cache banks, then the transference of the new cache line from fill buffer 320 into cache banks 318 is deferred until a victim cache line is identified within cache banks 318 for write-back to main memory 310. At that time, the new cache line is transferred from fill buffer 320 into cache banks 318 while the victim cache line is simultaneously transferred to write-back buffer 322 for subsequent write-back to main memory.

Depending upon the implementation, CPU 318 may have access to the new cache line immediately upon receipt by fill buffer 320 or access may be deferred until the new cache line is stored within cache banks 318.

Write operations are performed in much the same manner as the above-described read operation. In particular, data to be transferred from CPU 318 to main memory 310 is first received by DCU 314 which determines whether data corresponding to the address of the write request is already held within cache banks 318. If so, the data is merged into the cache line and the cache line is ultimately transferred to write-back buffer 322, perhaps in response to receipt of a new cache line by fill buffer 320 as the result of a read request. In that event, the cache line containing the data to be written to main memory is transferred to write-back buffer 322 simultaneously while the new cache line is transferred from fill buffer 320 into cache bank 318.

Hence, by providing a separate fill buffer and write-back buffer and by allowing for a cache line to be transferred from the fill buffer to the data cache bank while a victim line is simultaneously transferred form the data cache bank into the write-back buffer, a replace operation may be performed in only one clock cycle. By requiring only a single clock cycle, replace operations are performed more quickly. Furthermore, because the overall replace operation is performed substantially simultaneously, i.e. within a single clock cycle, coherency problems which would otherwise occur are avoided, thus obviating the need to provide for complicated circuitry or software for resolving coherency problems. However, as noted above, the other microprocessors of the system are capable of snooping the cache lines of DCU 314. To prevent coherency problems from occurring during such a snoop, the single clock cycle replace operation is aborted if the victim cache line is subject to a pending snoop operation. Other limitations on the ability to perform the single clock cycle replacement also exist. For example, in one implementation the write-back buffer 322 is capable of storing only a single cache line. In the event that the write-back buffer already holds a cache line which has not yet been transferred via system bus 308 to main memory 310, the single clock cycle replacement operation must be aborted until the write-back buffer is free. Also, in the exemplary implementation of FIG. 2 where each separate cache bank can only support one operation during any particular clock cycle, the replace operation can only be performed if no other operations are simultaneously being performed on any cache line. These, and other issues, are described generally with reference to FIG. 3, and in greater detail with reference to the specific embodiment illustrated in FIGS. 4–13. Finally with reference to FIG. 2, it should be noted that the single clock cycle replacement need not always be performed for transferring cache lines. For example, if the data cache banks are not full, a cache line can be transferred from the fill buffer into the cache banks without a simultaneous transference of a victim line to the write-back buffer. Also, circumstances arise where it is desirable to evict a cache line, even if no new cache line is received, such as to prevent data from becoming "stale" within the DCU. Hence, the single clock cycle replacement operation described herein need not be the only manner by which cache lines are replaced or evicted.

FIG. 3 illustrates method steps for performing the single clock cycle replace operation. Initially, at block 400, the DCU determines whether the write-back buffer is full. If full, the replace operation is aborted and reissued later, either by the CPU or by the DCU, at block 402. The abort is required when the write-back buffer is full because the system bus may not be able to transmit the cache line currently in the write-back buffer in time to make room for the victim cache line.

If, at block 400, the write-back buffer is not full, execution proceeds to step 404 where the DCU determines whether there is a read or write operation pending on any cache line within the DCU. As noted, in the implementation under consideration, portions of each cache line are stored within each cache bank and each cache bank is capable of performing only a single operation during each clock cycle. Hence, if a read or write operation is occurring within any bank on any cache line, then the selected victim cache line cannot be transferred to the write-back buffer. If a read or write is pending, then execution proceeds to step 406 where the DCU determines whether the fill buffer is full. If the fill buffer is not full, then the DCU waits for the next clock cycle when neither a read or write is pending, block 408, before continuing with the replace operation. However, if the fill buffer is full, then the pending read or write operation is aborted, block 410, thereby allowing the replace operation to proceed. Such is required when the fill buffer is full to ensure that cache lines within the fill buffer are emptied to allow for receipt of additional cache lines. In other words, the replace operation takes precedence over any pending read or write operation within the data cache if the fill buffer is full. In other implementations, it may be desirable to instead allow the read or write to continue while aborting or deferring the replace operation.

Regardless of whether a read or write was pending on any cache line and whether the fill buffer was full, execution ultimately proceeds to step 412 where the DCU identifies a cache line to be evicted. The identification of the victim cache line may be in accordance with conventional techniques. For example, the DCU may simply identify the oldest cache line containing modified data. At step 414, the DCU determines whether the victim cache line is subject to a pending snoop operation. Such may be performed by examining a snoop bit set in accordance with modified-exclusive-snoop-invalid (MESI) protocol, and such will be described in further detail below. If the victim cache line is subject to a snoop operation, then the replace operation is aborted, at step 416, and reissued later. The replace operation is aborted to prevent any coherency problems from occurring as a result of the pending snoop operation. However, in other implementations, rather than aborting the replace operation, it may be desirable to simply defer the replace operation until the victim cache line is no longer subject to the snoop operation.

If, at step 414, it is determined that the victim cache line is not subject to a snoop operation, execution proceeds to step 418 where the single clock cycle replace operation is performed for moving the victim cache line to the write-back buffer simultaneously while a line from the fill buffer is transferred into the memory space vacated by the victim cache line within the data cache bank. Thereafter, at step 420, the victim line is evicted from the write-back buffer to main memory. The actual write-back of the victim cache line may occur sometime after the replace operation of step 418, depending upon system bus availability. However, prompt write-back is preferred, since in the implementation under consideration, the write-back buffer is capable of storing only a single cache line and further replace operations must be aborted or deferred so long as the victim cache line remains within the write-back buffer.

Hence, FIGS. 1–3 provide an overview of the single clock cycle replace operation. Although the replace operation has been described primarily with reference to a write-back cache protocol, the single clock cycle replace can be advantageously exploited within a DCU configured with write-through protocol. Details of a particular implementation of a DCU which is capable of both write-back and write-through cache protocol operations is provided below with reference to the remaining Figures. Circuitry for facilitating the single clock cycle replace operation is provided in a set of schematics attached hereto as Appendix A.

EXEMPLARY IMPLEMENTATION

Figure 4A:
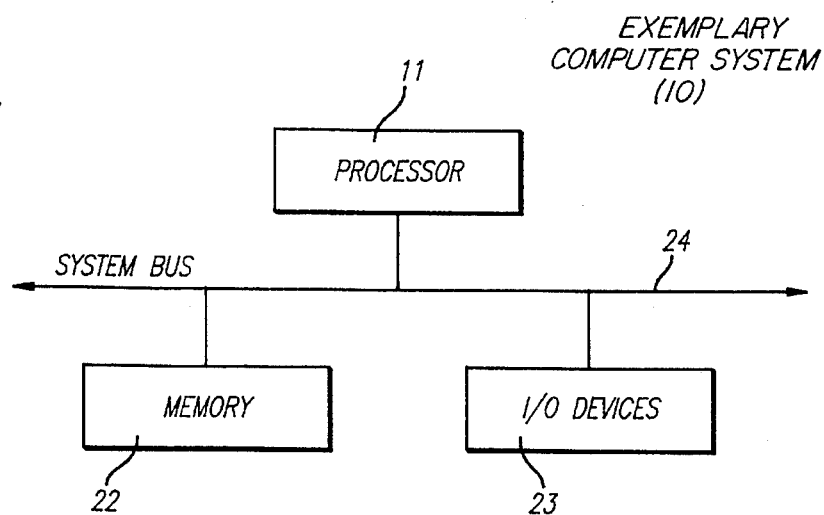
FIGS. 4a–4c illustrate a specific exemplary computer system incorporating aspects of the invention generally illustrated in FIGS. 1–3.
Figure 4B:
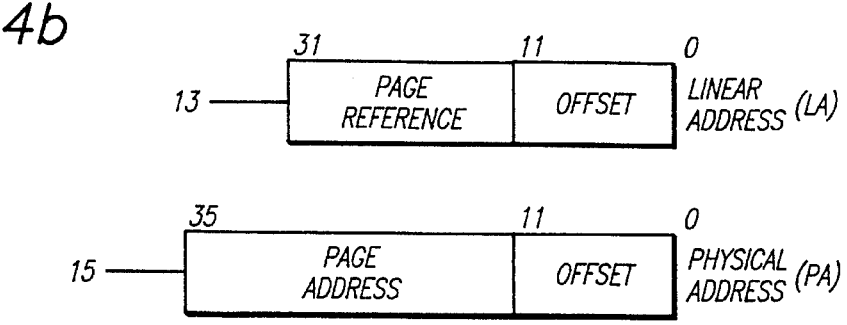
Figure 4C:
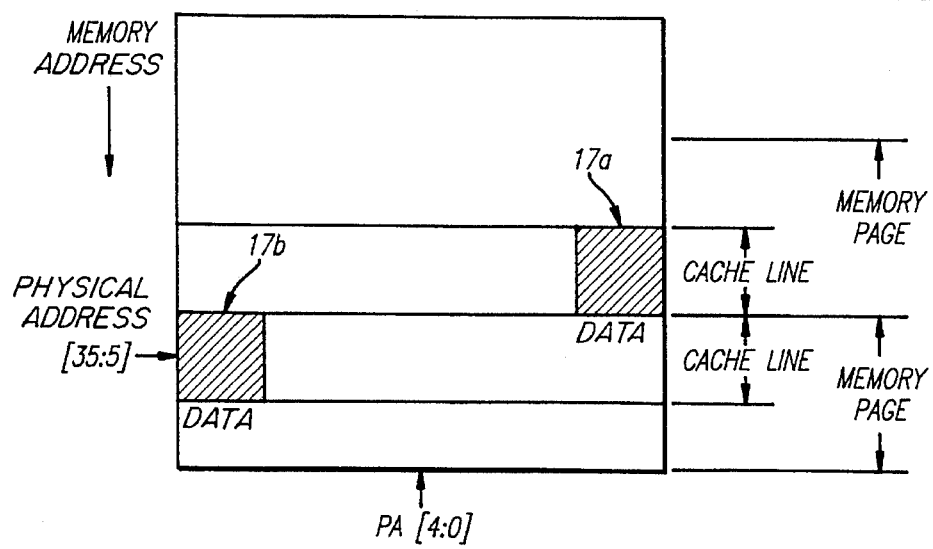

Referring to FIGS. 4a–4c, three block diagrams illustrating an exemplary computer system incorporating aspects of the invention are shown. Illustrated in FIG. 4a is an exemplary computer system 10 having a processor 11, a memory unit 22, a set of I/O devices 23, and a system bus 24, connected as shown. As will be described in further detail below, processor 11 includes an internal DCU 20 (see FIGS. 5). Processor 11 is formed on a single silicon-based chip. Herein, the term memory subsystem includes DCU 20 as well as memory unit 22. As described in parent U.S. application Ser. No. 08/202,448, DCU 20 is a non-blocking cache. By non-blocking cache it is meant that processor 11 is not stalled even if a cache miss is encountered while accessing DCU 20.

Computer system 10 supports virtual address spaces having memory locations of memory unit 22 and the addresses of I/O devices 23, which are partitioned into memory pages and organized into memory segments. During program execution, memory space locations are referenced by instructions, including read and write instructions, using linear addresses, which in turn are translated into physical addresses. A linear address is computed using a base address, a displacement value, a scale value, an index value, and a segment value. As illustrated in FIG. 4b, a linear address 13 includes a translated portion which identifies a memory page, and an untranslated portion which identifies the offset into the memory page. Correspondingly, a physical address 15 includes the translated portion of the linear address locating the memory page, and the untranslated portion of the linear address locating the offset into the memory page. In one embodiment, a linear address 13 is 32 bits long with the 20 higher order bits translated, and the 12 lower order bits untranslated. A physical address 15 is 36 bits long with the 24 higher order bits being the translated portion, and the 12 lower order bits being the untranslated portion of the linear address.

As illustrated in FIG. 4c, the loading and storing of data 17a and 17b from and to memory space locations need not be data boundary aligned. In other words, read and write data 17a and 17b may be split over, for example, two data chunks, two cache lines, as well as two memory pages. Load and write data 17a and 17b that is memory page split misaligned is also by definition cache line split misaligned. Similarly, read and write data 17a and 17b that is cache line split misaligned is by definition data chunk split misaligned. In one embodiment, a memory page is 4K bytes, a cache line is 32 bytes, and a data chunk is 8 bytes.

Except for aspects of the invention incorporated in processor 11, elements 11, 23–24 represent a broad category of processors, memory units, I/O devices, and system buses found on many computer systems. The basic functions and operations of the elements are well known and will not be further described. DCU 20 of the invention and its operations will be described in further detail below with additional references to the remaining figures.

Although aspects of the invention are being described with reference to exemplary computer system 10 illustrated in FIGS. 4a–4c, aspects of the invention may also be practiced on other computer systems configured in alternative embodiments, having different addressing mechanisms, and/or different data boundary alignments. In particular, computer system 10 may include additional processors, i.e. a multi-processor system as illustrated in FIG. 1. Furthermore, the functions of processor 11 may be formed on one or more chips, fabricated using silicon or other semiconductor materials.

Figure 5:
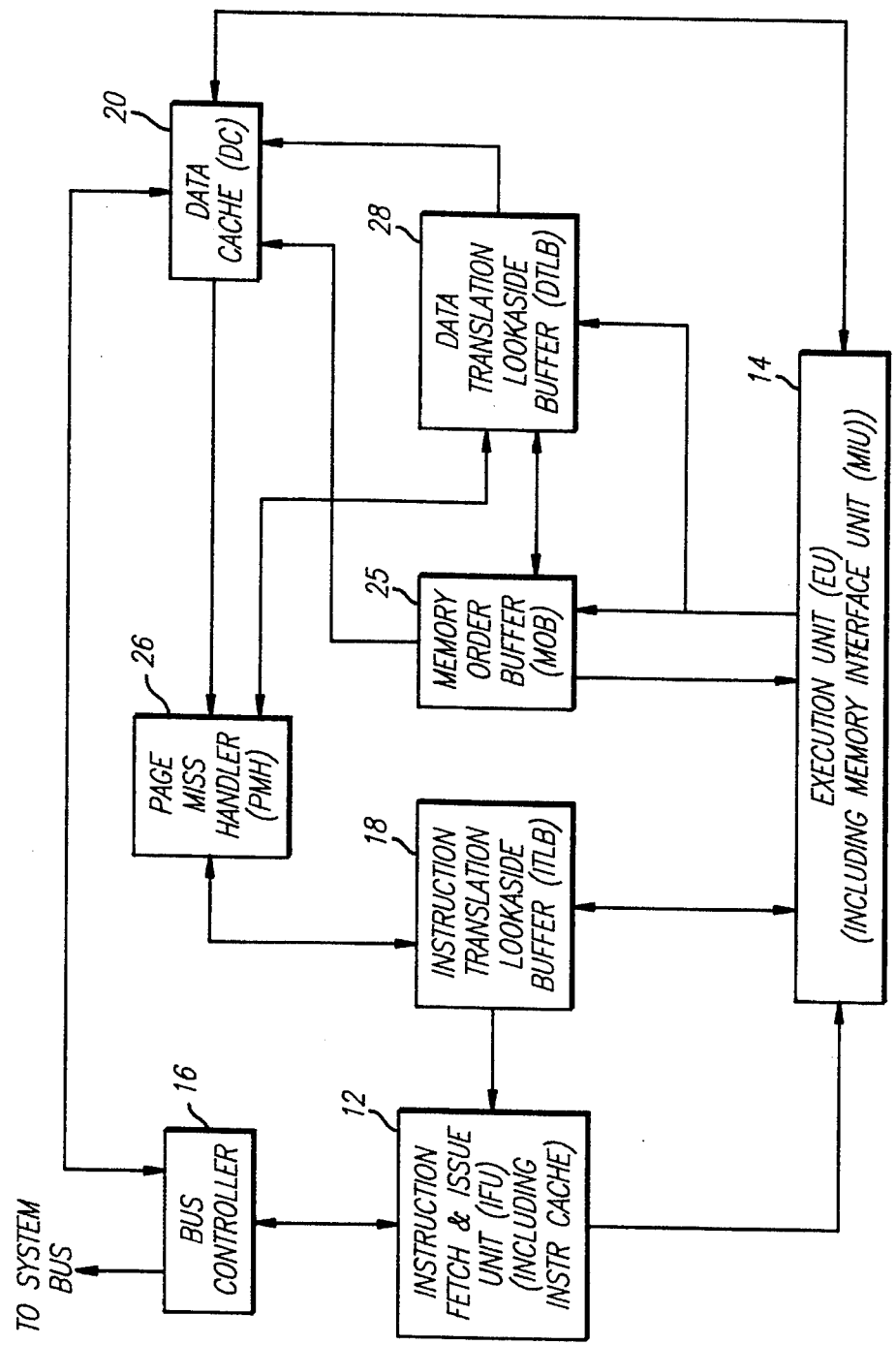
FIG. 5 illustrates relevant portions of one embodiment of the processor of FIG. 4a in further detail.

Referring now to FIG. 5, a block diagram illustrating processor 11 of FIG. 4a is shown in further detail. As illustrated, processor 11 includes an instruction fetch and issue unit (IFU) 12, an out-of-order (OOO) execution unit (EU) 14, a bus controller 16, an instruction and a data translation lookaside buffer (ITLB and DTLB) 18 and 28, a page miss handler (PMH) 26, a memory order buffer (MOB) 25 and DCU 20, connected as shown. IFU 12 includes an instruction cache (not shown) and EU 14 includes a memory interface unit (MIU) (not shown). DCU 20 comprises a set of fill buffers 30 (see FIGS. 3a–3b). MOB 25, DTLB 28, PMH 26, and MIU 34 collectively serve as the memory order interface (MOI) components interfacing between the rest of the EU 14 and the memory subsystem, i.e. DCU 20 and memory unit 22. DCU 20 and memory unit 22 are interconnected through bus controller 16 and system bus 24 and together cooperate to fetch, issue, execute, and save execution results of instructions in a pipelined manner.

IFU 12 fetches instructions from memory unit 22 through bus controller 16 and system bus 24, stores the instructions in the instruction cache, and issues the instructions in program order to execution unit 14 for execution. Some instructions are fetched and issued speculatively. EU 14 executes the instructions as soon as operand dependencies on execution results of preceding instructions are resolved, including instructions that are speculatively fetched and issued. In other words, the instructions are not necessarily executed in the order issued and some instructions are speculatively executed. However, the execution results are retired or committed to processor states in order, and speculative execution results of mis-predicted branches are purged. Herein, data in processor states means the data is valid and available to other processor components external to EU 14.

The address portions of the stores are dispatched from EU 14 to MOB 25 and DTLB 28, whereas the data portions of the stores are buffered in MIU 34. In due course, unless purged, both the address and data portions are dispatched from MOB 25 and the MIU of EU 14 to DCU 20. Similarly, the address portions of the reads are dispatched from EU 14 to MOB 25. In due course, unless purged, the address portions are dispatched either to DCU 20 or to the MIU of the EU 14 (for buffered write forwarding). The retrieved data is saved in EU 14, and in due course, unless purged, is retired/committed to processor states.

As described earlier, both the instruction cache of IFU 12 and DCU 20 are physically addressed. ITLB 18 and DTLB 28, among other functions, translate the accessing linear addresses that are currently cached into physical addresses through table lookups, provide memory types for the physical addresses, and perform a number of fault detections. The PMH 26 handles page misses in both the instruction cache of IFU 12 and DCU 20, and provides, among other functions, translation of page missed linear addresses into physical addresses, determination of memory types for the page missed physical addresses, and allocation and filling of cache lines.

For a more detailed description of executing a write operation as two independent STA and STD operations, see copending U.S. patent application Ser. No. 08/483,285, entitled Method and Apparatus For Performing Store Operations, filed Jun. 7, 1995, which is a continuation of U.S. patent application Ser. No. 08/117,250 filed Jan. 4, 1994, now abandoned. For a more detailed description of forwarding buffered write data for read operations, see copending U.S. patent application Ser. No. 08/176,111, entitled Method and Apparatus For Forwarding Buffered Store Data In An Out-Of-Order Execution Computer System, filed on Dec. 30, 1993. For a more detailed description of reading and storing misaligned data, see copending U.S. patent application Ser. No. 08/202,445, entitled Method and Apparatus For Loading And Storing Misaligned Data On An Out-Of-Order Execution Computer System, filed Feb. 28, 1994. All of the above identified U.S. patent applications are assigned to the assignee of the invention and are hereby fully incorporated by reference.

IFU 12, ITLB 18, and bus controller 16 represent a broad category of these elements found in many computer systems, are well known, and will not be further described. Execution unit 14, MOB 25, DTLB 28, and PMH 26 also represent a broad category of conventional elements found in computer systems including but not limited to those described in the above identified copending U.S. patent applications. Fill buffers 30 and DCU 20 will be described in further detail below.

Figure 6A:
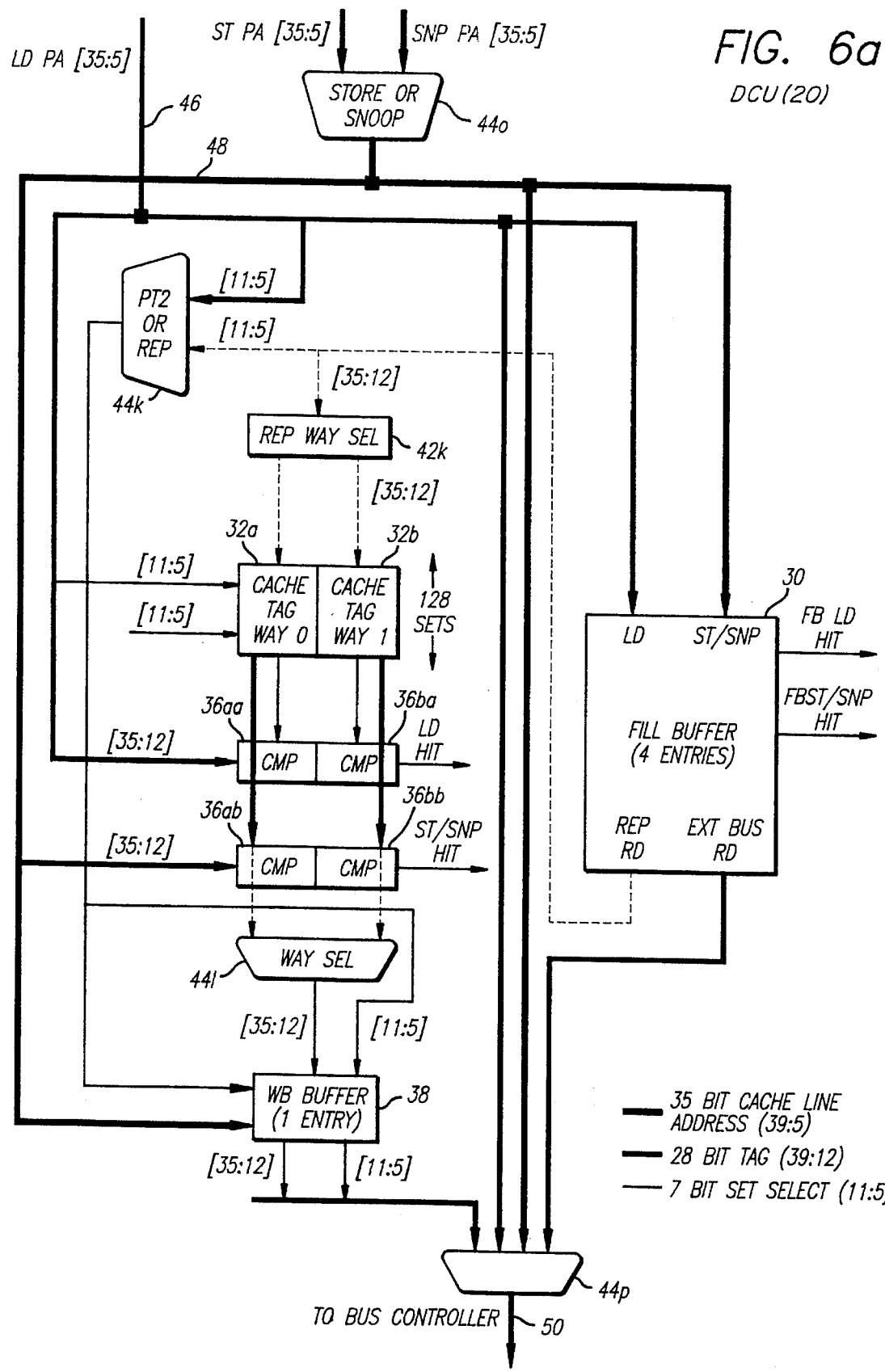
FIGS. 6a–6b illustrate relevant portions of one embodiment of the DCU of FIG. 5 in further detail from the address and data path views.
Figure 6B:
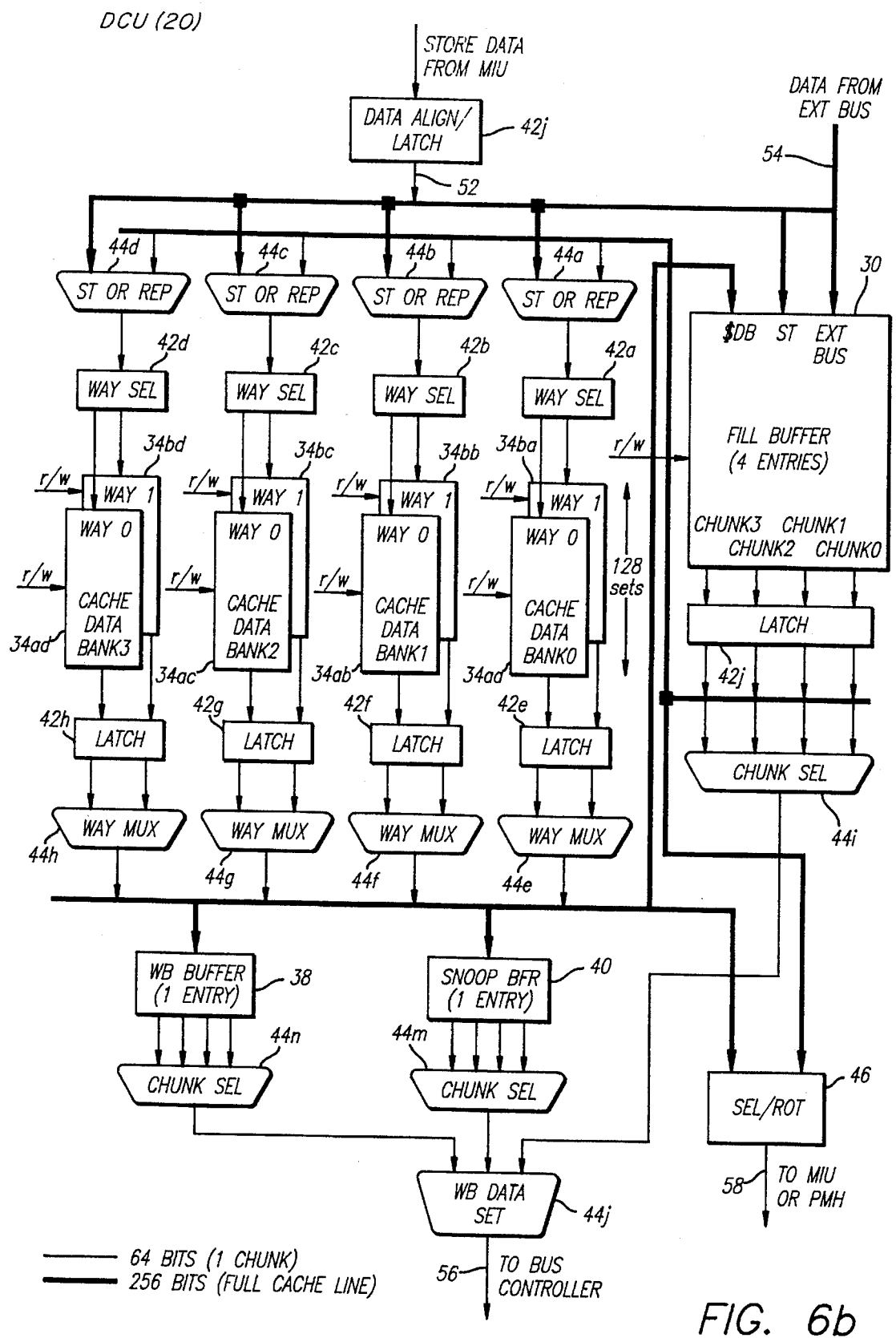

Referring to FIGS. 6a–6b, an address path and a data path view illustrating the relevant portions of one embodiment of DCU 20 of FIG. 5 are shown. In the embodiment illustrated, DCU 20 is a physically addressed 2-way set associate cache having 128 sets of cache lines. However, the DCU may be practiced with other associative or non-set associative cache mapping.

DCU 20 includes two cache tag arrays 32a–32b, one for each way, eight cache data banks 34aa–34ad and 34ba–34bd, four for each way, and a set of address tag match circuits 36aa–36ab and 36ba–36bb. Additionally, DCU 20 includes a set of fill buffers 30, a write-back buffer 38, a snoop buffer 40, a selector/rotator 46, a set of latches 42a–42k, and a set of multiplexors 44a–44q. Furthermore, DCU 20 includes two address input ports 46 and 48, one address output port 50, two data input ports 52 and 54, and two data output ports 56 and 58. These elements are interconnected as shown. In one embodiment, select/rotator 46 is connected to the MIU of EU 14 and PMH 26 through a shared data return bus. Together, the elements cooperate to cache data from memory unit 22 and respond to reads and stores.

Cache data banks 34*aa*–34*ad* and 34*ba*–34*b* write data currently being cached in DCU 20. Cache tag arrays 32*a*–32*b* store addresses and control information for the cache lines. Tag matching circuits 36*aa*–36*ab* and 36*ba*–36*bb* tag match the accessing addresses against the addresses output by the tag arrays 32*a*–32*b*.

Cache data banks 34*aa*–34*ad* and 34*ba*–34*bd* can be written into and read independently. Cache tag arrays 32*a*–32*b* can be accessed by two accessing addresses at the same time, and in like manner, tag matching circuits 36*aa*–36*ab* and 36*ba*–36*bb* can perform tag matches for two accessing addresses at the same time.

The size of cache data banks 34*aa*–34*ad* and 34*ba*–34*bd* is dependent on the size of a cache line, the number of cache lines in a set, and the number of sets. In one embodiment, cache data banks 34*aa*–34*ad* and 34*ba*–34*bd* are sufficiently large to store 128 sets of 2 way associative 32 bytes cache lines. The size of the cache tag arrays 32*a*–32*b* is complementary to cache data banks 34*aa*–34*ad* and 34*ba*–34*bd*.

As illustrated, the set select portion of a read address (LD PA[11:5]) is used to access cache tag arrays 32*a*–32*b*, and the way select portion of the read address (LD PA[35:12]) is used by tag matching circuits 36*aa*–36*ab* to perform tag matchings. The byte select portion of the read address is not shown, because it is used for data alignment only. Concurrently, the set select portion of either a store or a snoop address (ST/SNP PA[11:5]) is used to access cache tag arrays 32*a*–32*b*, and the way select portion of the store/snoop address (ST/SNP PA[35:12]) is used by tag matching circuits 36*ba*–36*bb* to perform tag matchings. Similarly, the byte select portion of the store address is not shown, because it is used for data alignment only.

Fill buffers 30 store cache lines currently being filled, respond to reads and stores that miss cache data banks 36*aa*–36*ab* and 36*ba*–36*bb* and perform other functions described in more detail below. Fill buffers 30 are preferably organized in a fully associative manner. One of fill buffers 30 is allocated for each cache fill. The allocation is performed at the time the cache miss is encountered. To allocate, fill buffers 30 are examined in a predetermined manner, such as a circular manner, and the first free fill buffer 30 is chosen for allocation. At the completion of a cache fill, the content of cache fill buffer 30 is output and written into one of the cache lines in cache data banks 34*aa*–34*ad* and 34*ba*–34*bd*, if the memory locations are cacheable and the cache fill buffer 30 was not snoop hit while the cache fill was in progress.

In the embodiment illustrated, there are four fill buffers 30. In other words, up to four cache fills can be in progress at the same time. The number of fill buffers 30 required to ensure their availability to serve cache misses is dependent on the frequency of cache misses and the time required to perform a cache fill. Experience has shown that the number of fill buffers is typically small.

The accessing read and the store/snoop addresses are also used to access fill buffers 30 at the same time, in the event that the accessing read and store/snoop addresses miss cache data banks 34*aa*–34*ad* and 34*ba*–34*bd*.

Selector/rotator 46 performs data selection and/or rotation on the data read out of either cache data banks 34*aa*–34*ad* and 34*ba*–34*bd* or one of fill buffers 30, aligning the data as appropriate before returning the output data to either the MIU of EU 14 or PMH 26, in response to a read operation.

Write-back and snoop buffers 38 and 40 store data being written back into memory unit 22 as a result of a cache line being evicted and a cache snoop hit respectively. Write-back buffer 38 also stores the address of the cache line being evicted (PA[35:11]). While DCU 20 is basically a write-back cache, however through the multiprocessor cache coherency protocol MESI (Modified, Exclusive, Share & Invalid), DCU 20 can behave as if it is a write through cache for a selected subset of the memory locations.

Thus, in general, a read operation and either a write or snoop operation can be serviced concurrently, except under certain circumstances, such as if all four cache data banks 34*aa*–34*ad* or 34*ba*–34*bd* are being accessed for cache line replacement or if both the read and the write operations are against the same cache data bank 34*aa*, . . . or 34*bd*.

Figure 7B:
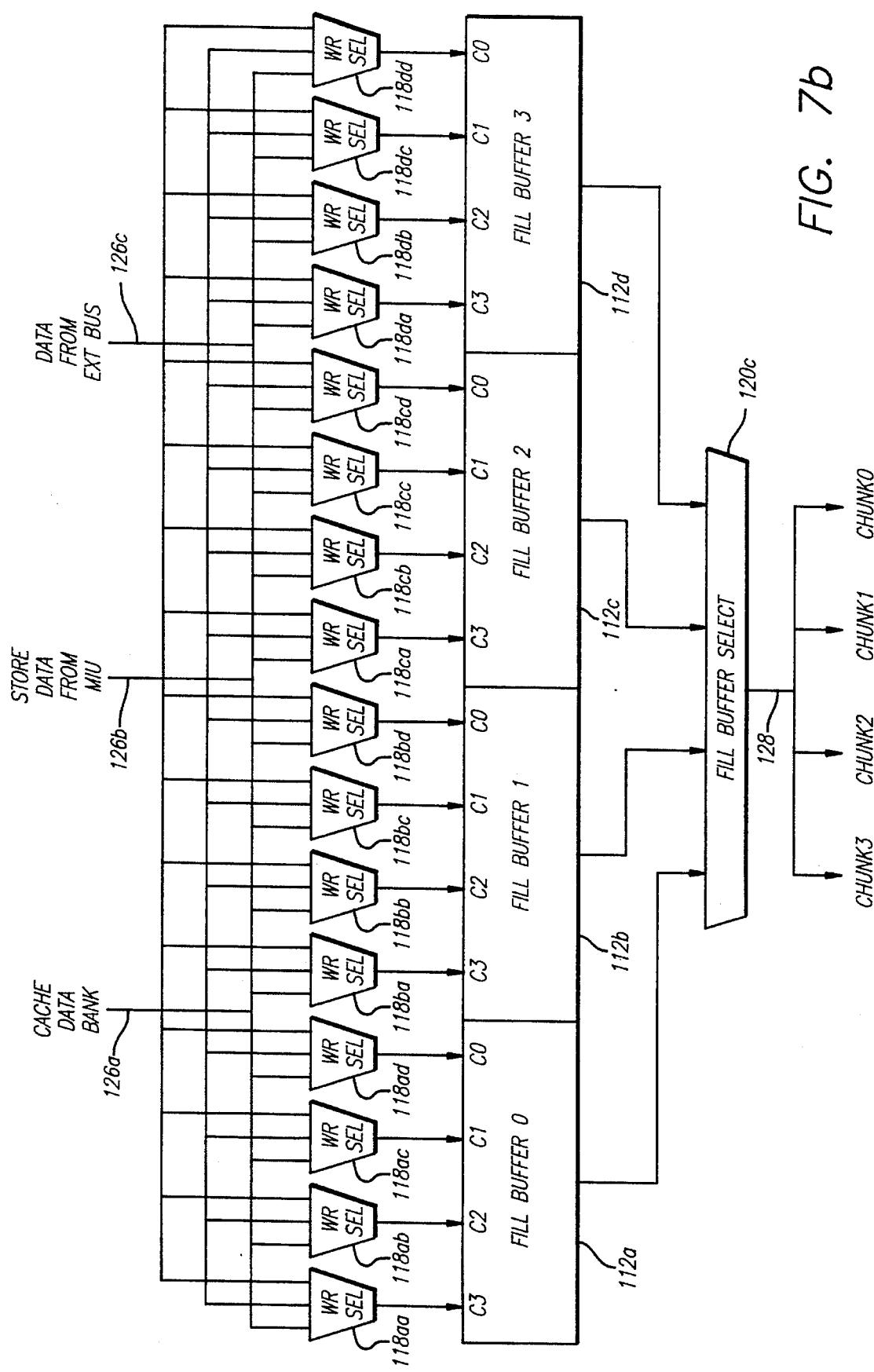

Referring now to FIGS. 7*a*–7*b*, an address path view and a data path view of the relevant portions of one embodiment of fill buffers 30 of FIGS. 6*a*–6*b* are shown. As illustrated, fill buffers 30 include a set of buffer slots 112*a*–112*d*, a set of tag matching circuits 114*aa*–114*ad* and 114*ba*–114*bd*, a set of address write selectors 116*a*–116*d*, a set of data write selectors 118*aa*–118*ad*, 118*ba*–118*bd*, 118*ca*–118*cd*, and 118*da*–118*dd*, and a set of multiplexors 120*a*–120*c*. Additionally, fill buffers 30 have two address input ports 112*a*–112*b*, two address output ports 124*a*–124*b*, three data input ports 126*a*–126*c*, and one data output ports 128. These elements are interconnected as shown. Together, the elements hold a number of cache lines currently being filled, respond to reads and stores that miss cache data banks 34*aa*–34*ad* and 34*ba*–34*bd*, and perform a number of other functions.

Buffer slots 112*a*–112*d* hold cache lines currently being filled, including control and state information. Tag matching circuits 114*aa*–114*ad* and 114*ba*–114*bd* address match the accessing addresses against the addresses output by buffer slots 112*a*–112*d*.

Addresses can be written into buffer slots 112*a*–112*d* independently. Address write selectors 116*a*–116*d* are independently controlled. Data, in data chunk granularity, can be written into the appropriate locations of the cache lines held in the buffer slots 112*a*–112*d* independently. Data write selectors 118*aa*–118*ad*, 118*ba*–118*bd*, 118*ca*–118*cd*, and 118*da*–118*dd* are also independently controlled. Additionally, buffer slots 112*a*–112*d* can be accessed by two accessing addresses at the same time, and in like manner, tag matching circuits 114*aa*–114*ad* and 114*ba*–114*bd* can perform tag matches for two accessing addresses at the same time.

PA[35:5] of a read address is used by tag matching circuits 114*aa*–114*ad* to tag match against the way and set select portions of the cache line addresses stored in buffer slots 112*a*–112*d*. The byte select portion of the read address is not shown because it is used for data alignment only. Concurrently, PA[35:5] of either a write or a snoop address is used by tag matching circuits 114*ba*–114*bd* to tag match against the way and set select portions of the cache line addresses stored in buffer slots 112*a*–112*d*. Similarly, the byte select portion of the write address is not shown because it is used for data alignment only.

Each read or write that misses both cache data banks 34*aa*–34*ad* and 34*ba*–34*bd* is allocated a buffer slot 112*a*, . . . or 112*d*. The read/write address is then provided to memory unit 22 via the system bus through address output port 124*b*. Fill data from memory unit 22, in data chunk granularity, are returned through data input port 126c. Address and data of a fill completed replacement cache line are conditionally provided to cache tag arrays 32a–32b and cache data banks 34aa–34ad and 34ba–34bd through the address and data output ports 124a and 128 respectively. Store data of a write operation that misses cache data banks 34aa–34ad and 34ba–34bd but hit one of buffer slots 112a, ... or 112d, in data chunk granularity, are written into the appropriate locations of the cache line held in one of buffer slots 112a, ... or 112d through data input port 126b. Load data of a read operation that misses cache data banks 34aa–34ad and 34ba–34bd but hit one of buffer slots 112a, ... or 112d are provided to EU 14/PMH 26 through data output port 128. Lastly, data input port 126a is used to move data, in data chunk granularity, from cache data banks 34aa–34ad and 34ba–34bd to fill buffers 30.

In other words, fill buffers 30 are provided with sufficient number of buffer slots 112a–112d, address and data input and output ports 122a–122b, 124a–124b, 126a–126c, and 128, address write selectors, 116a–116d, and data write selectors 118aa–118ad, 118ba–118bd, 118ca–118cd, and 118da–118dd to allow buffer slots 112a–112d to operate independently, and service multiple cache fills, reads, and stores/snoops concurrently. As a result, cache misses are handled by fill buffers 30 in a manner transparent to cache tag arrays 32a–32b and cache data banks 34aa–34ad and 34ba–34bd, allowing cache tag arrays 32a–32b and cache data banks 34aa–34ad and 34ba–34bd to serve subsequent reads and stores even with cache fills in progress and without requiring a stall of EU 14.

Figure 8:
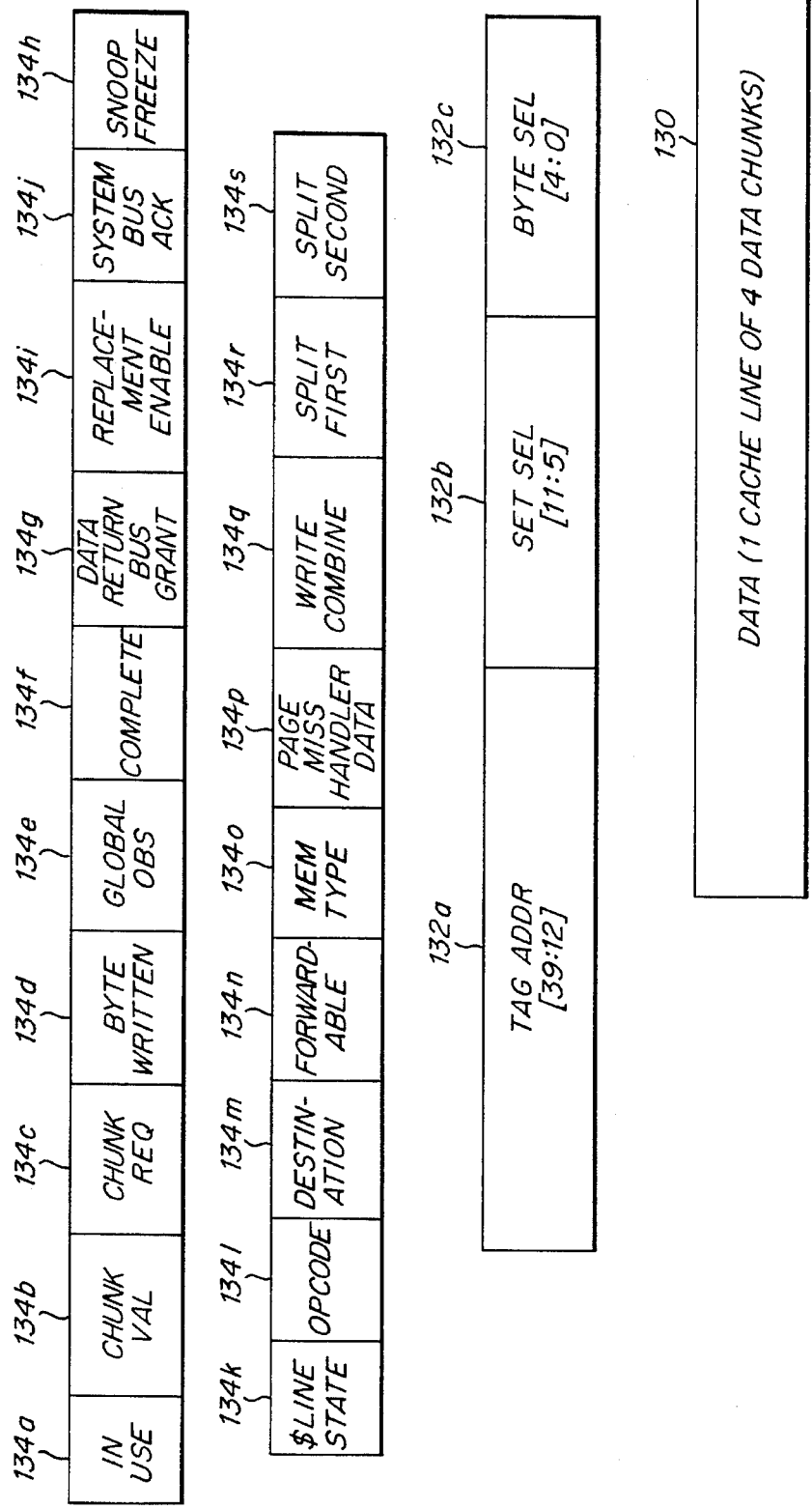
FIG. 8 illustrates relevant contents of one of the fill buffer slots of FIGS. 7a–7b in further detail.

Referring now to FIG. 8, a block diagram illustrating the relevant contents of one of fill buffer slots 112a–112d of FIGS. 7a–7b is shown. As illustrated, each buffer slot 112a, ... or 112d contains the cache line data being filled 130, the way, set, and byte select portions of the cache line address (PA[35:12], PA[11:5], and PA[4:0]) 132a–132c. Additionally, each buffer slot 112, ... or 112d contains a number of control and state information for the cache fill in progress including an in-use bit 134a, a group of data chunk valid bits 134b, a group of data chunk request bits 134c, a group of byte written bits 134d, a globally observed bit 134e, a cache fill completion bit 134f, a data return bus grant bit 134g, a snoop freeze bit 134h, a replacement enabled bit 134i, and a system bus acknowledged bit 134j. Furthermore, each buffer slot 112, ... or 112d contains a number of control and state information for a pending read being served including a group of cache line state bits 134k, an opcode 134l, a destination register identifier 134m, a forwardable bit 134n, a group of memory type bits 134o, a PMH data bit 134p, a write combine bit 134q, a first and a second misaligned read bit 134r and 134s.

In-use bit 134a when set indicates that the buffer slot is currently in use. Each of the data chunk valid bits 134b when set indicates the corresponding data chunk is valid. Each data chunk request bit 134c when set indicates the corresponding data chunk contains data bytes requested by a pending read. Each byte written bit 134d when set indicates a data byte in the cache line is written by a write operation.

System bus acknowledged bit 134i when set indicates that a request by buffer slot 112a, ... or 112d has been acknowledged by system bus 24. Globally observed bit 134e when set indicates that a request by buffer slot 112a, ... or 112d has been globally observed in a multiprocessor system. Cache fill completion bit 134f when set indicates that all cache fill data has been received. Snoop freeze bit 134j when set indicates buffer slot 112a, ... or 112d was hit by a snoop while the cache fill was in progress. Replacement enabled bit 134h when set indicates that the cache line is ready to be placed into the cache data banks 34aa–34ad and 34ba–34bd. Data return bus grant bit 134g when set indicates buffer slot 112a, ... or 112d has been granted the data return bus shared by the MIU of EU 14 and PMH 26.

Cache line state bits 134k indicate the current MESI state of the cache line. Opcode 134l describes the pending read operation. Register identifier 134m identifies the destination register of the EU 14. Forwardable bit 134n when set indicates buffer slot 112a, ... or 112d contains an access which must return data back to EU 14 or PMH 26. Memory type bits 134o identify the memory type of the source memory locations of the pending read. PMH data bit 134p when set indicates that the pending read is for the PMH 26.

Write combine bit 134q when set indicates that buffer slot 112a, ... or 112d is being used as a write combining buffer for write combining write operations. Lastly, the first and the second misaligned read bits 134r and 134s when set indicate that buffer slot 112a, ... or 112d is being used as a staging buffer for the first and second aligned subset read operations of a misaligned read operation.

Figure 9A:
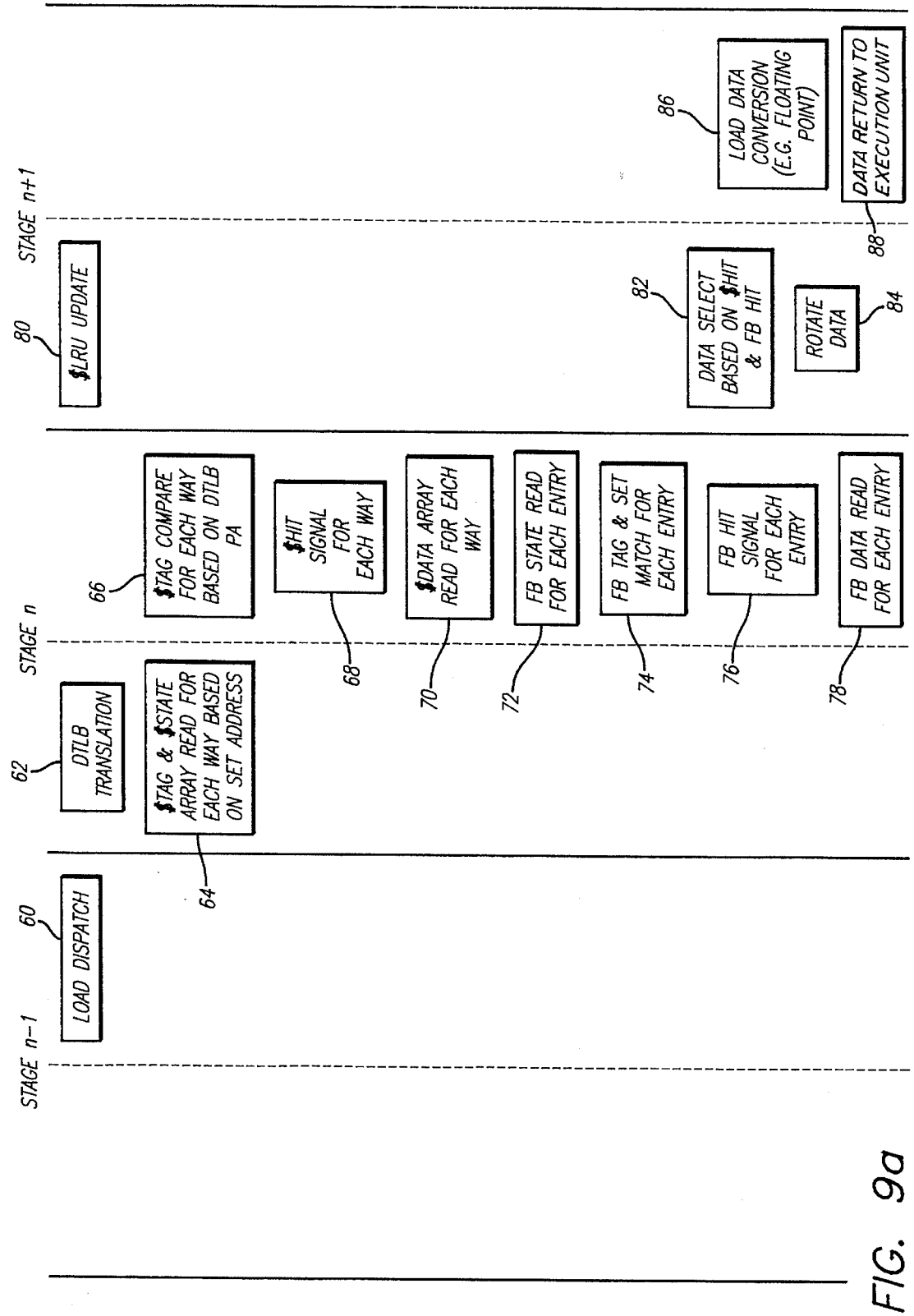
FIGS. 9a–9b illustrate basic operational steps of the data cache of FIG. 5 for reading and storing data.
Figure 9B:
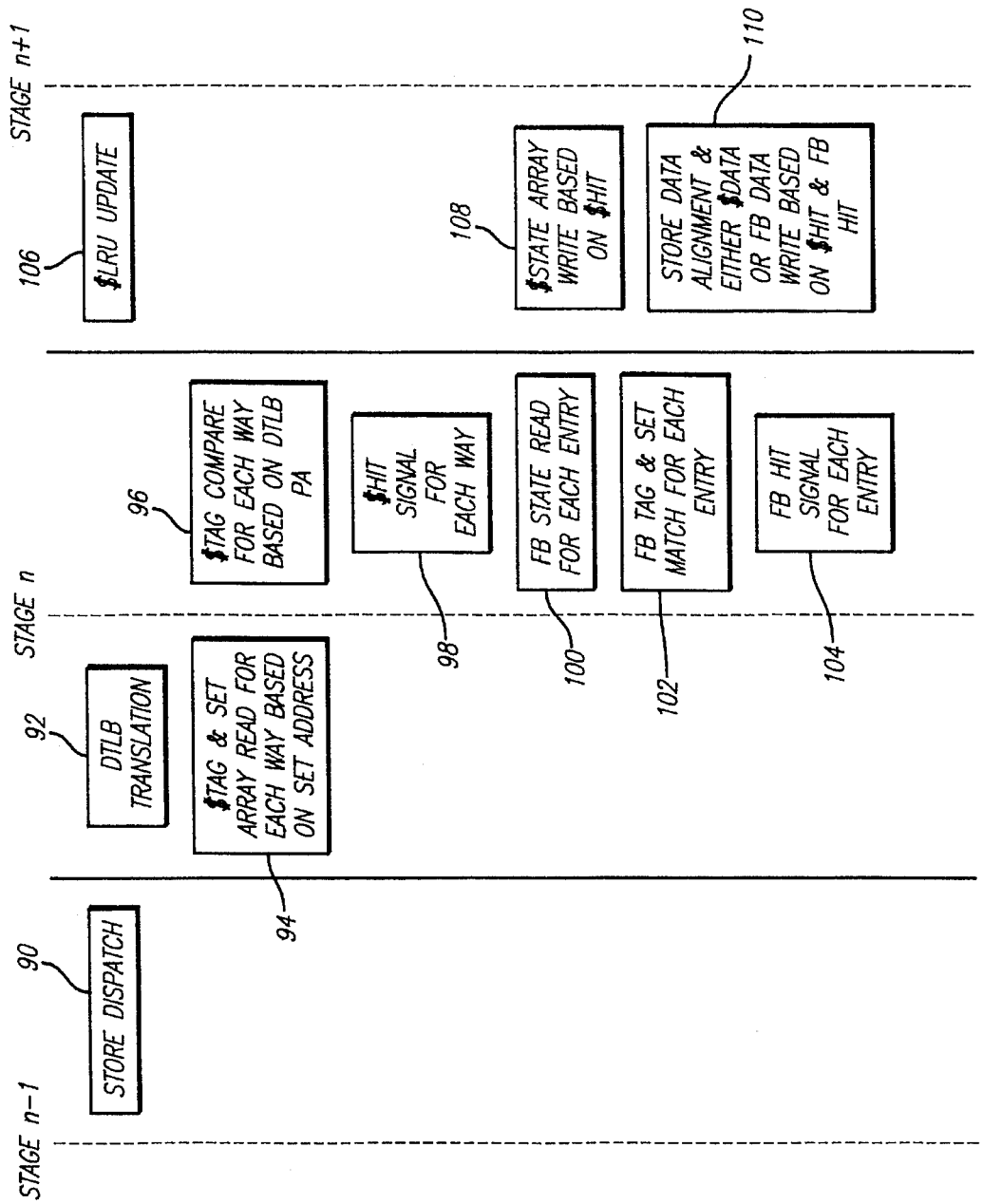

Referring to FIGS. 9a–9b, two block diagrams illustrating basic operational steps of DCU 20 of FIG. 5 for reading and storing data are shown. As illustrated in FIG. 6a, from dispatch to completion, a basic read takes three pipe stages to execute. During the later part of pipe stage n−1, the read operation is dispatched to DTLB 28 and DCU 20, at block 60. During the earlier part of pipe stage n, the LA of the read operation is translated into PA by DTLB 28, at block 62. Then, cache tag arrays 32a–32b are accessed using PA[11:5], the set select portion of the read address, at block 64. During the later part of pipe stage n, the addresses read out of cache tag arrays 32a–32b are tag matched using PA[35:12], the way select portion of the read address, at block 66. A cache hit/miss signal is generated for each way, at block 68. Concurrently, the corresponding cache line for each way is read out of cache data banks 34aa–34ad and 34ba–34bd, block 70.

In the meantime, fill buffers 30 are accessed to read the states of the cache lines being filled to ensure the state are all valid, at block 72. The accessing PA[35:5] are matched against the way and select portions of the cache line address of each fill buffer 30, at block 74. A fill buffer hit/miss signal is generated for each fill buffer 30, at block 76. Lastly, during this period, the available data of each cache line being filled are read, at block 78.

During the earlier part of pipe stage n+1, the LRU information in the cache tag array 32a–32b are updated accordingly, at block 80. At the same time, data selection is made based on the cache and fill buffer hit results, at block 82. Additionally, the selected data is rotated as appropriate, aligning the data being read out, at block 84. Finally, at the later part of stage n+1, data conversion (such as floating point) is performed for the data being read out, at block 86, and then returned to EU 14 or PMH 26, at block 88. The data is returned to PMH 26 if the read is issued by PMH 26 as denoted by the setting of the PMH data bit 134p.

If the read operation misses cache data banks 34aa–34ad and 34ba–34bd, but hits one of fill buffers 30, but the read data has not yet been returned from main memory 22, fill buffer slot 112a, ... or 112d blocks the read operation, causing the read operation to be redispatched subsequently. If the read operation misses cache data banks 34aa–34ad and 34ba–34bd, and fill buffers 30, one of fill buffer slots 112a–112d is allocated to handle the read cache miss. Thus, read cache misses are "absorbed" by fill buffers 30, enabling DCU 20 to avoid having to stall processor execution because of a read cache miss.

As illustrated in FIG. 9b, from dispatch to completion, a basic write also takes three pipe stages to execute. During the later part of pipe stage n-1, the write operation is dispatched to DTLB 28 and DCU 20, at block 90. During the earlier part pipe stage n, the LA of the write operation is translated into PA by DTLB 28, t block 92. Then, cache tag arrays 32a-32b are accessed using PA[11:5], the set select portion of the write address, at block 94. During the later part of pipe stage n, the addresses read out of cache tag arrays 32a-32b are tag matched using PA[35:12], the way select portion of the write address, at block 96. A cache hit/miss signal is generated for each way, at block 98.

In the meantime, fill buffers 30 are accessed to read the states of the cache lines being filled to ensure they are in valid states, at block 100. The accessing PA[35:5] are matched against the way and set select portions of the cache line address of each fill buffer 30, at block 102. A fill buffer hit/miss signal is generated for each fill buffer 30, at block 104.

During the earlier part of pipe stage n+1, the LRU and state information in the cache tag array 32a-32b are updated accordingly, at blocks 106 and 108. Finally, at the later part of stage n+1, the write data is aligned and written into either one of cache data banks 34aa-34ad and 34ba-34bd, or one of fill buffers 30 based on the cache/fill buffer hit/miss signals, block 110. If the write data is written into one of fill buffers 30, the byte written bits 134d and the cache line state bits 134k of fill buffer slot 112a, . . . 112d are updated accordingly. Byte written bits 134d prevent the write data to be overwritten by subsequent returning cache fill data. Cache line state bits 134k allow cache coherency to be maintained for the cache line even while it is being filled. Thus, write cache misses are "absorbed" by fill buffers 30, enabling DCU 20 to avoid stalling processor execution because of a write cache miss.

Figure 10A:
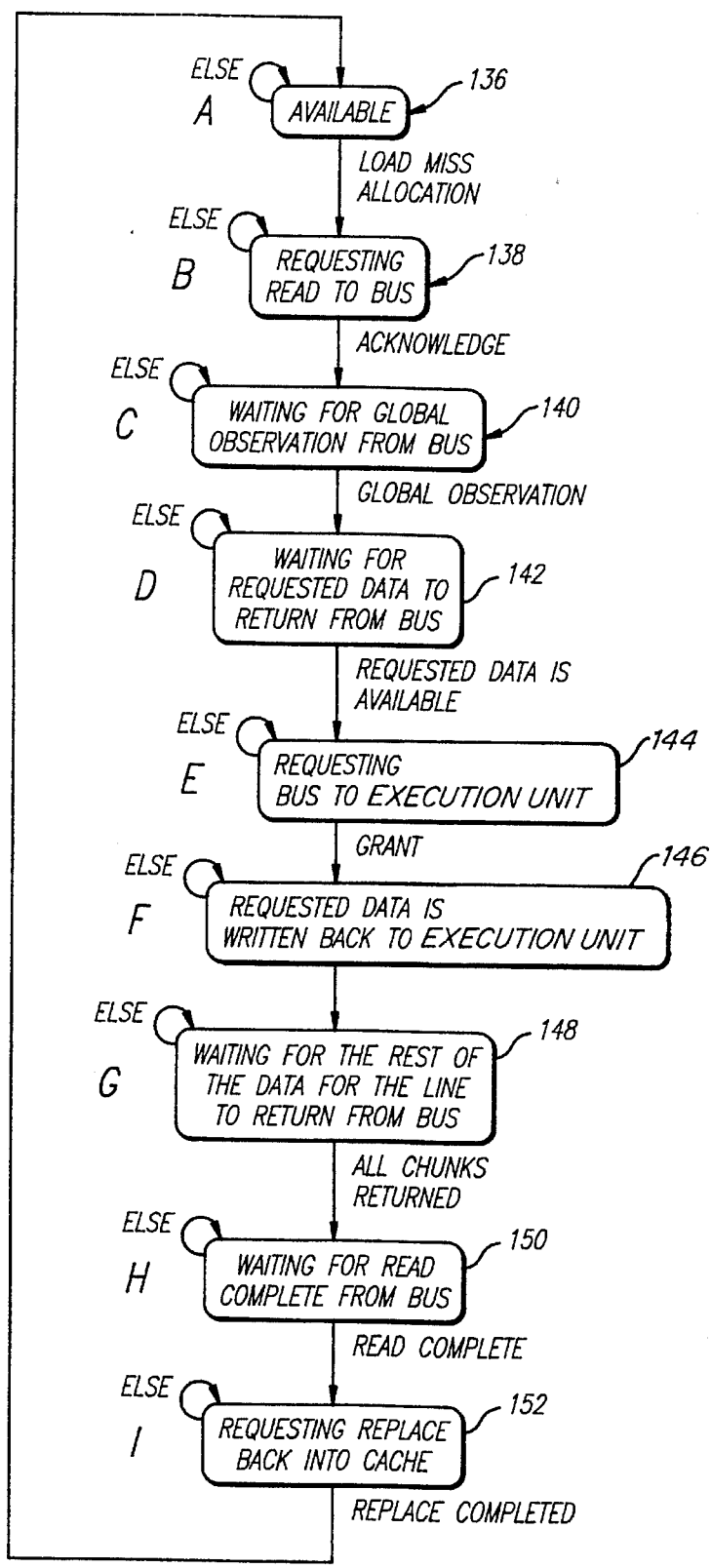
FIGS. 10a and 10b illustrate operational states of a fill buffer slot of FIGS. 7a–7b during a read and a write cache miss.
Figure 10B:
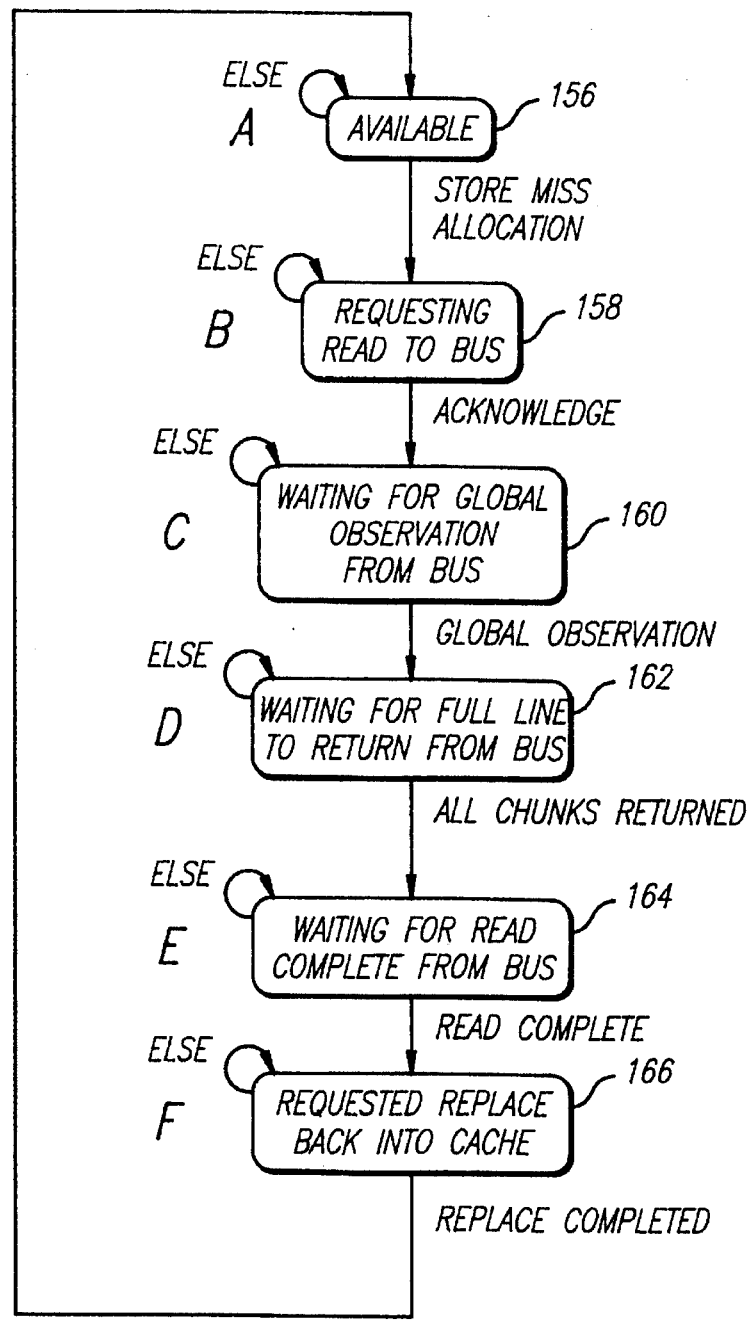

Referring now to FIGS. 10a-10b, two block diagrams illustrating operating states of one of fill buffer slots 112a-112d of FIGS. 7a-7b during a read miss and a write miss are shown. As illustrated in FIG. 10a, initially a fill buffer slot 112a, . . . or 112d is in an available state 136. Fill buffer slot 112a, . . . or 112d remains in available state 136, until it is allocated to a cache fill in response to a read miss. Upon allocation, fill buffer slot 112a, . . . or 112d sets in-use bit 134a denoting its allocation, updates the way, set, and byte select portion of cache line address 132a-132c, and other application control and state information, makes a bus request for the cache line data, and enters a waiting for acknowledgment state 138.

Fill buffer slot 112a, . . . or 112d remains in waiting for acknowledgment state 136, until the bus request is acknowledged. Upon acknowledgment, fill buffer slot 112a, . . . or 112d sets acknowledgment bit 134i, and enters a waiting for global observation state 140. Fill buffer slot 112a, . . . or 112d remains in the waiting for global observation state 140, until informed by the bus that its request has been globally observed. Upon being so informed, fill buffer slot 112a, . . . or 112d sets globally observed bit 134e, and enters a waiting for requested data state 142.

Fill buffer slot 112a, . . . or 112d remains in waiting for request data state 142, until the first chunk of the requested data returns. Upon receiving the first chunk of the requested data, fill buffer slot 112a, . . . or 112d writes data 130 and sets chunk valid bits 134b accordingly if there has not been a subsequent write operation writing data into the same memory locations (the write operation would have hit and stored the data into the fill buffer slot). Additionally, fill buffer slot 112a, . . . or 112d arbitrates for the data return bus, and enters a waiting for data return bus grant state 144. In the presently preferred embodiment, the first chunk of the requested data is the critical chunk. Fill buffer slot 112a, . . . or 112d remains in the waiting for the data return bus grant state 144, until its request for the data return bus is granted. Upon granting the data return bus, fill buffer slot 112a, . . . or 112d sets data return bus grant bit 134g, and enters a data return state 146. Data are returned to either EU 14 or PMH 26. If the data is returned to PMH 26, fill buffer slot 112a, . . .112d also signals PMH 26. Fill buffer slot 112a, . . . or 112d remains in data return state 146, until the data return is completed. Upon completing the data return, fill buffer slot 112a, . . . or 112d enters a waiting for the rest of the requested data state 148.

Fill buffer slot 112a, . . . or 112d remains in the waiting for the rest of the requested data state 148, until all data chunks have been returned. As the data chunks are returned, appropriate chunk valid bits 134b are updated. Upon receiving the rest of the requested data, fill buffer slot 112a, . . . or 112d enters a waiting for read complete state 150. Fill buffer slot 112a, . . . or 112d remains in the waiting for read complete state 150, until read complete is signaled. Upon being signaled, fill buffer slot 112a, . . . or 112d conditionally enters a waiting for replacement state 152 if the cache fill completed cache fill is to be output for cache data banks 34aa-34ad and 34ba-34bd. Fill completed cache line is to be output for cache data banks 34aa-34ad and 34ba-34bd if the memory locations are cacheable and the cache line was not snoop hit while the cache fill was in progress. The cacheability of the memory locations are denoted by memory type 134o. As described earlier, snoop hit is denoted by snoop freeze bit 134j. If the fill completed cache line is not output for cache data banks 34aa-34ad and 34ba-34bd, it is subsequently read and handled by bus controller 16 in due course. Upon completion of the replacement, fill buffer slot 112a, . . . or 112d resets in-use bit 134a, effectively deallocating itself, and returns to available state 136.

As illustrated in FIG. 10b, initially a fill buffer slot 112a, . . . or 112d is in an available state 156. Fill buffer slot 112a, . . . or 112d remains in the available state 156, until it is allocated to a cache fill in response to a write miss. Upon allocation, fill buffer slot 112a, . . . or 112d sets in-use bit 134a denoting its allocation, writes data 130, updates byte written bits 134d, the way, set, and byte select portion of cache line address 132a-132c etc., makes a bus request for the cache line data, and enters a waiting for acknowledgment state 158.

Fill buffer slot 112a, . . . or 112d remains in the waiting for acknowledgment state 136, until the bus request is acknowledged. Upon acknowledgment, fill buffer slot 112a, . . . or 112d sets acknowledgment bit 134i, and enters a waiting for global observation state 160. Fill buffer slot 112a, . . . or 112d remains in the waiting for global observation state 160, until informed by the bus that its request has been globally observed. Upon being so informed, fill buffer slot 112a, . . . or 112d sets globally observed bit 134e, and enters a waiting for all requested data to complete state 162.

As the requested data return, fill buffer slot 112a, . . . or 112d stores data 130 and sets chunk valid bits 134b accordingly if the returning data is not for memory locations masked by byte written bits 134d, i.e. memory locations written by the missed or subsequent write operations. Fill buffer slot 112a, . . . or 112d remains in the waiting for all requested data to complete state 162, until all requested data is returned by memory unit 22. Upon receiving all requested data, fill buffer slot 112a, . . . or 112d enters a waiting for read complete state 164. The fill buffer slot 112a, . . . or 112d remains in the waiting for read complete state 164, until read complete is signaled. Upon being signaled, fill buffer slot 112a, . . . or 112d enters a waiting for replacement state 166. The filled completed cache line is to be output for cache data banks 34aa–34ad and 34ba–34bd if the memory locations are cacheable and the cache line was not snoop hit while the cache fill was in progress. The cacheability of the memory locations are denoted by memory type 134o. As described earlier, snoop hit is denoted by snoop freeze bit 134j. If the fill completed cache line is not output for cache data banks 34aa–34ad and 34ba–34bd, it is subsequently read and handled by bus controller 16 in due course. Upon completion of the replacement, fill buffer slot 112a, . . . or 112d resets in-use bit 134a, effectively deallocating itself, and returns to available state 156.

Figure 11:
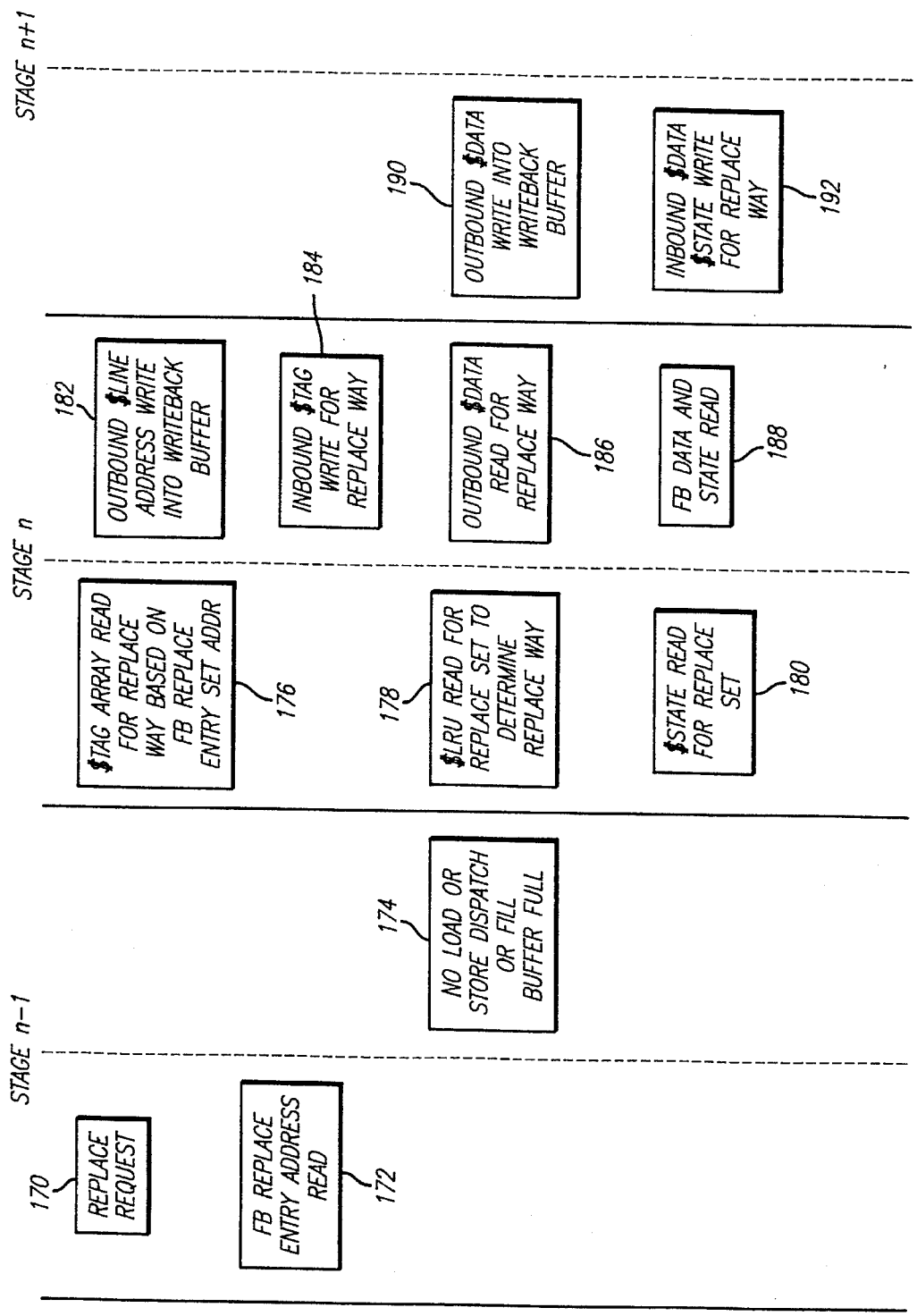
FIG. 11 illustrates operational steps of a fill buffer slot of FIGS. 7a–7b for replacing a cache line.

Referring now to FIG. 11, a block diagram illustrating the operational steps of one of fill buffer slots 112a–112d of FIGS. 7a–7b for replacing a cache line is shown. As illustrated, the cache line replacement operation takes three pipe stages to complete. In the early part of pipe stage n−1, fill buffer slot 112a, . . . or 112d issues the replacement request, block 170. Concurrently, the replacement cache line's addresses are output for cache tag arrays 32a–32b, block 172.

After issuing the replacement request, fill buffer slot 112a, . . . or 112d will proceed if no read or write is dispatched during the later part of stage n−1. Otherwise, fill buffer slot 112a, . . . or 112d will wait for such condition to be met, unless fill buffer slots 112a, . . . or 112d are all used. In that event, any read or write issued will be blocked by fill buffer slot 112a, . . . or 112d with the outstanding replacement request, causing the read or write operation to be redispatched at a later time. In the presently preferred embodiment, only one replacement request can be outstanding at any point in time.

Then, in the early part of pipe stage n, cache tag arrays 32a–32b are read for replace way selection based on the way select portion of the cache line address output for the replace request, block 176. Concurrently, cache tag arrays 32a–32b are read for state and LRU information for replace set selection, blocks 178–180. During the later part of pipe stage n, the addresses of the cache line being evicted are written into write-back buffer 38, block 182; concurrently, address of the replacement cache line is written into cache tag arrays 32a–32b, block 184. Similarly, the data of the cache line being evicted is read out of cache data banks 34aa–34ad and 34ba–34bd, block 186; concurrently, the data of the replacement cache line and state is read out of fill buffer slot 112a, . . . or 112d. Finally, in the early part of pipe stage n+1, data being read out of cache data banks 34aa–34ad and 34ba–34bd is written into write-back buffer 38, block 186; concurrently, data of the replacement cache line and state being read out of fill buffer slot 112a, . . . or 112d is written into cache data banks 34aa–34ad and 34ba–34bd.

Figure 12:
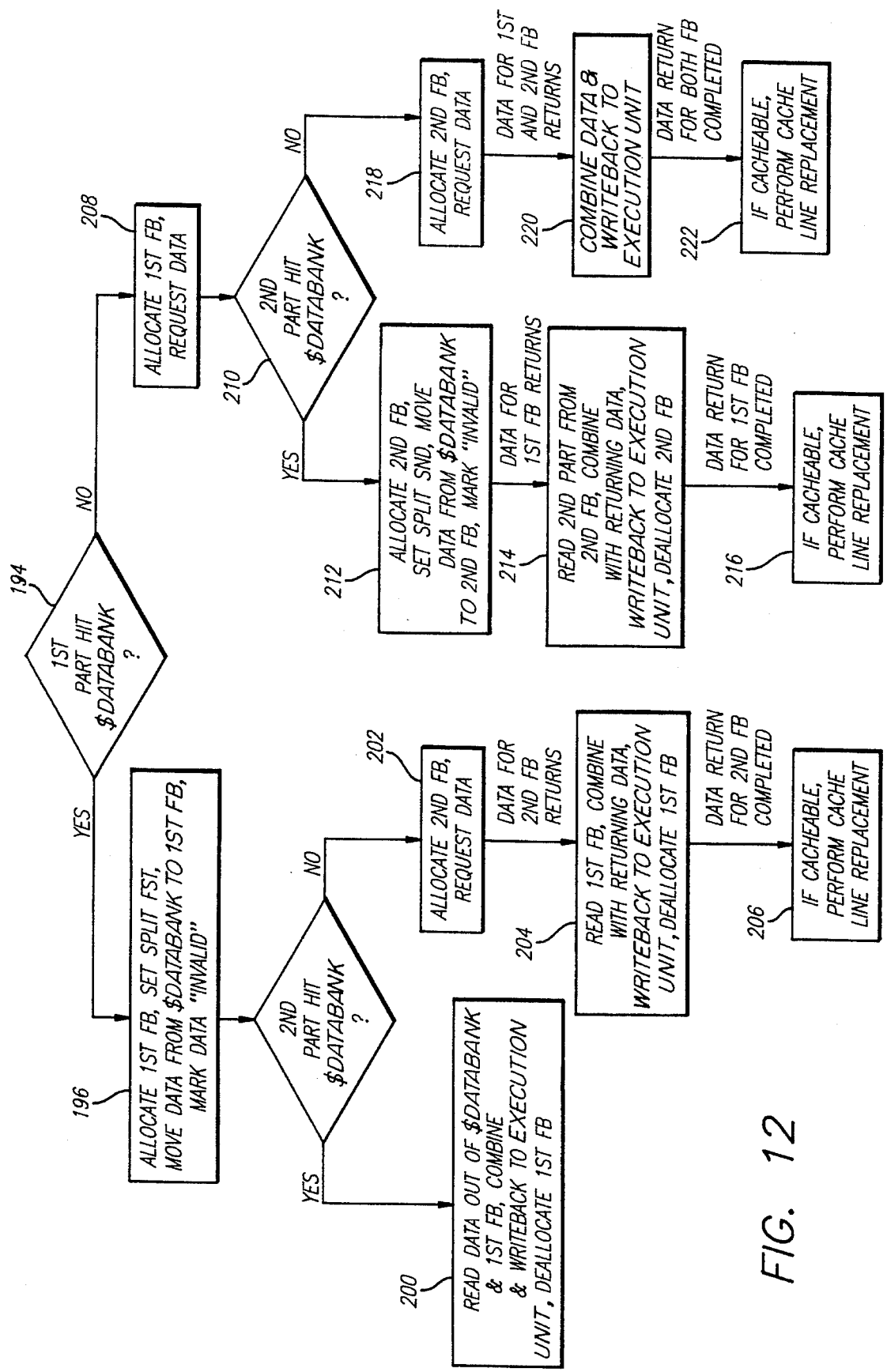
FIG. 12 illustrates operational steps of a fill buffer slot of FIGS. 7a–7b for servicing the aligned subset read operations of a misaligned read operation.
Figure 13:
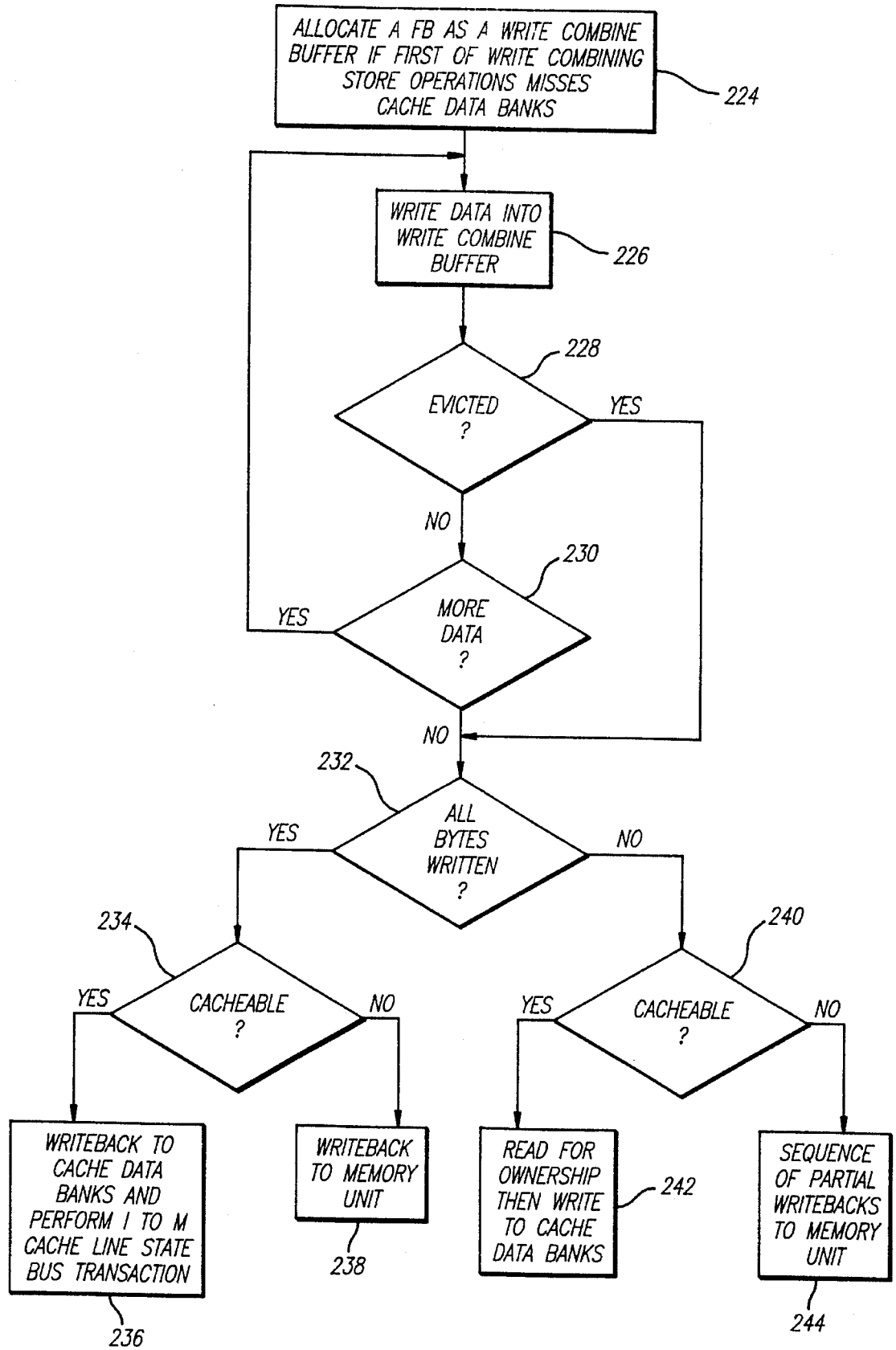
FIG. 13 illustrates operational steps of a fill buffer slot of FIGS. 7a–7b for servicing a sequence of write combining write operations.

Referring now to FIGS. 12–13, two block diagrams illustrating the operational steps of a fill buffer slot 112a, . . . or 112d of FIGS. 7a–7b for application to two non-cache fill but related functions are shown. FIG. 12 illustrates the operational steps for servicing the aligned subset read operations of a misaligned read operation, whereas, FIG. 13 illustrates the operational steps for servicing a sequence of write combining write operations.

As described earlier, read and write operations are not required to be directed against data boundary aligned memory locations. Load and write operations may be data chunk misaligned, cache line misaligned, and memory page misaligned. For cache line/memory page misaligned read/ write operations, they are dispatched as aligned subset read/write operations. In particular, in one embodiment, the misaligned read/write operation is dispatched as a first and a second aligned subset read/write operation. For a more detailed description of reading and storing misaligned data, see the above identified U.S. patent applications incorporated by reference.

Fill buffers 30 handle the separate dispatching of the aligned subset write operations as if they are distinct write operations, no other special handling is required. As illustrated in FIG. 12, for the separately dispatched aligned subset read operations, if the first aligned subset read operation hits cache data banks 34aa–34ad, and 34ba–34bd, a first fill buffer slot 112a, . . . or 112d is allocated. Additionally, split first bit 134r is set, data is moved from cache data banks 34aa–34ad, and 34ba–34bd to the allocated fill buffer slot 112a, . . . or 112d, and the data is marked as "invalid". Block 196.

If the second aligned subset read operation also hits cache data banks 34aa–34ad, and 34ba–34bd, the corresponding data is read out of cache data banks 34aa–34ad, and 34ba–34bd and allocated fill buffer slot 112a, . . . or 112d, combined, written back to EU 14 or PMH 25. Fill buffer slot 112a, . . . or 112d is then deallocated. Block 200.

However, if the second aligned subset read operation misses cache data banks 34aa–34ad, and 34ba–34bd, a second fill buffer slot 112a, . . . or 112d is allocated, and the missed data is requested. Block 202. When the requested data returns, the appropriate data is read out of the first allocated fill buffer slot 112a, . . . or 112d and combined with the returning data. The combined data is then written back to EU 14 or PMH 26, and first fill buffer slot 112a, . . . or 112d is deallocated. Block 204. Finally, after all requested data has been returned, if the memory locations are cacheable and the cache line has not been snoop hit while the cache fill is in progress, cache line replacement as described earlier is performed. Block 206.

On the other hand, if the first aligned subset read operation misses cache data banks 34aa–34ad, and 34ba–34bd, a first fill buffer slot 112a, . . . or 112d is allocated, and the missed data is requested. Block 208.

If the second aligned subset read operation hits cache data banks 34aa–34ad, and 34ba–34bd, a second fill buffer slot 112a, . . . or 112d is allocated. Additionally, split second bit 134r is set, data is moved from cache data banks 34aa–34ad, and 34ba–34bd to allocated fill buffer slot 112a, . . . or 112d, and the data is marked as "invalid". Block 212.

When the requested data for first allocated fill buffer 112a, . . . or 112d returns, the corresponding data is read out of second allocated fill buffer slot 112a, . . . or 112d, combined with the returning data, and written back to EU 14 or PMH 25. Second fill buffer slot 112a, . . . or 112d is then deallocated. Block 214. Finally, after all requested data have been returned, if the memory locations are cacheable and the cache line has not been snoop hit while the cache fill is in progress, cache line replacement as described earlier is performed, block 216.

However, if the second aligned subset read operation also misses cache data banks 34aa–34ad, and 34ba–34bd, a second fill buffer slot 112a, . . . or 112d is allocated, and the missed data is requested. Block 218. When the requested data return, the appropriate data is read out of first allocated fill buffer slot 112a, ... or 112d, combined with the returning data, and written back to EU 14 or PMH 26. Block 220. Finally, after all requested data has been returned, for each cache line, if the memory locations are cacheable and the cache line has not been snoop hit while the cache fill is in progress, cache line replacement as described earlier is performed. Block 220. Cache line replacement for two allocated fill buffer slots 112a, ...or 112d are independently determined and performed.

Write combining write operations are extensions of the standard write operations for string move, string copy, bit blt operations in graphics applications. Since a large number of read-for-ownership cache line fills resulted from a large number of write operations is a significant burden and waste of the bus bandwidth, it is more advantageous to collect the write operations having the same "cache line" addresses, i.e., the higher order bits, regardless whether the destination memory locations are cacheable or not, and combine them before writing them back into memory unit 22 as a single write operation.

As illustrated in FIG. 10, when a first of these write combining write operations misses cache data banks 34aa–34ad and 34ba–34bd, a fill buffer slot 112a, ... or 112d is allocated. Block 224. The write combining nature of the write operation is inferred from the instruction opcode or memory type. The write data is written into allocated fill buffer slot 112a, ... or 112d. Block 226. The write data of write combining write operations that hit cache data banks 34aa–34ad and 34ba–34bd are written into cache data banks 34aa–34ad and 34ba–34bd.

In the presently preferred embodiment, only one logical write combining buffer is supported. If a second one is needed, the first one is evicted and allocated for the second sequence of write combining write operations. Thus, upon writing the write data of the first encountered write combining write operation, allocated fill buffer slot 112a, ... or 112d writes the write data of the subsequent write combining write operations having the same "cache line" addresses, so long as allocated fill buffer slot 112a, ... or 112d is not being evicted for other usages. Blocks 226–230.

When all bytes of the "cache line" being held have been written, and the memory locations are cacheable and haven't been snoop hit, fill buffer slot 112a, ... or 112d writes the data back into cache data banks 34aa–34ad and 34ba–34bd through a cache line replacement operation as described above. Block 236. Additionally, fill buffer slot 112a, ... or 112d causes an I to M cache state transition bus transaction to be performed. Block 236. If all bytes of the "cache line" being held have been written and the memory locations are noncacheable, fill buffer slot 112a, ... or 112d writes the data back into memory unit 22 as described above. Block 238.

However, if all bytes of the "cache line" being held have not been written, i.e. the write combine buffer is being evicted, but the memory locations are cacheable and have not been snoop hit, fill buffer slot 112a, ... or 112d performs a read-for-ownership and then writes the data back into cache data banks 34aa–34ad and 34ba–34bd through a cache line replacement operation as described above. Block 242. Finally, if all bytes of the "cache line" being held have not been written, but the memory locations are not cacheable, fill buffer slot 112a, ... or 112d writes the data back into memory unit 22 as described above. Block 244.

What has been described is a computer system configured with a data cache unit capable of performing a single clock cycle cache line replace operation. The data cache unit includes a separate write-back buffer and a separate fill buffer. The provision of the separate write-back buffer and fill buffer in combination with the single cycle replace capability allows for particularly efficient cache replace operations which expedite the handling of read and write operations. As noted above, schematics for a circuit capable of performing the single clock cycle replace operation are provided within Appendix A. Additional details of the DCU have been described particularly the ability of the DCU to be non-blocking.

While the invention has been described with reference to illustrated embodiments, the invention is not limited to the embodiments described. Rather, the method and apparatus of the invention can be practiced with modification and alteration within the spirit and scope of the claims. The description is thus to be regarded as illustrative instead of limiting on the invention.

… # APPENDIX A

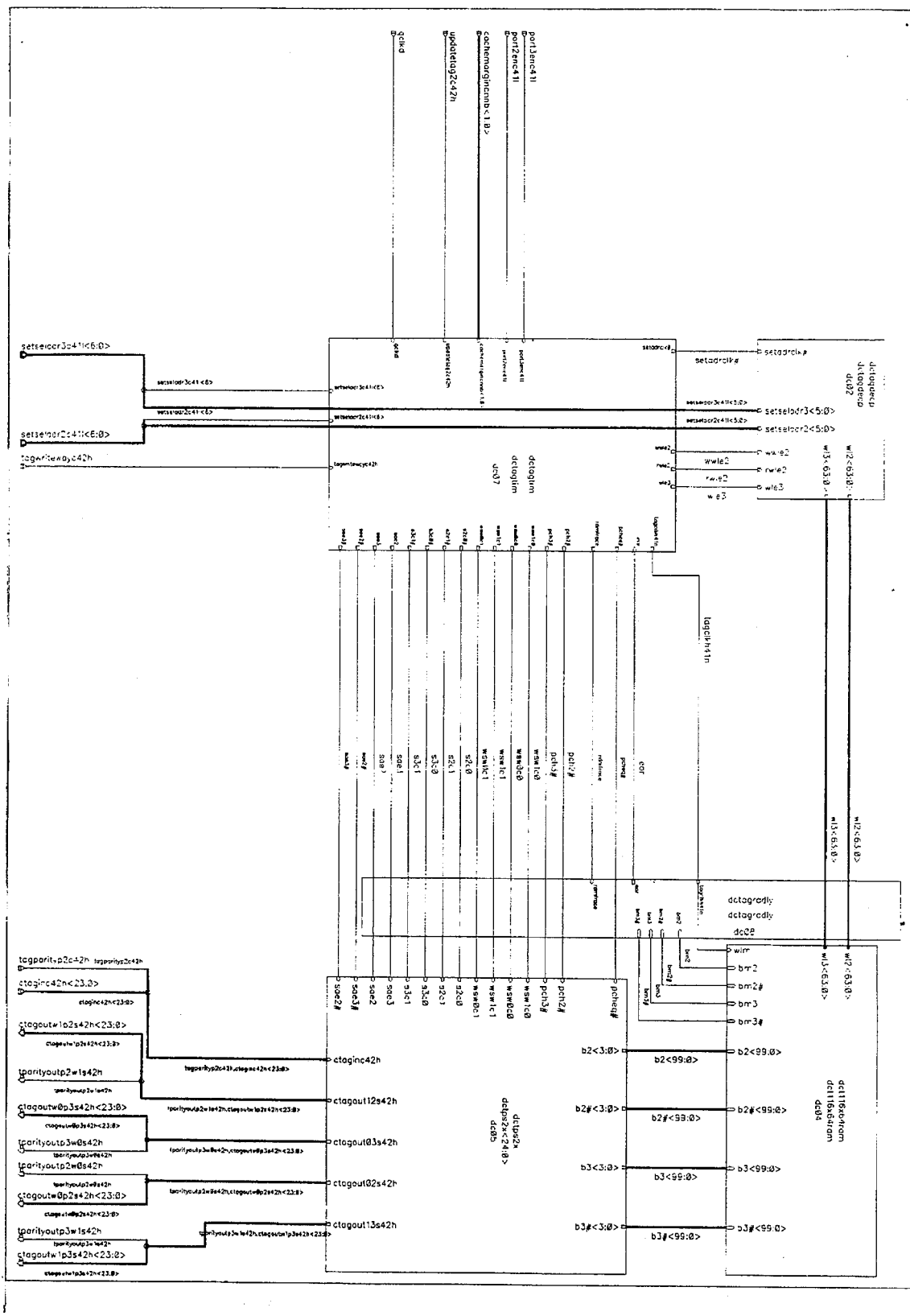

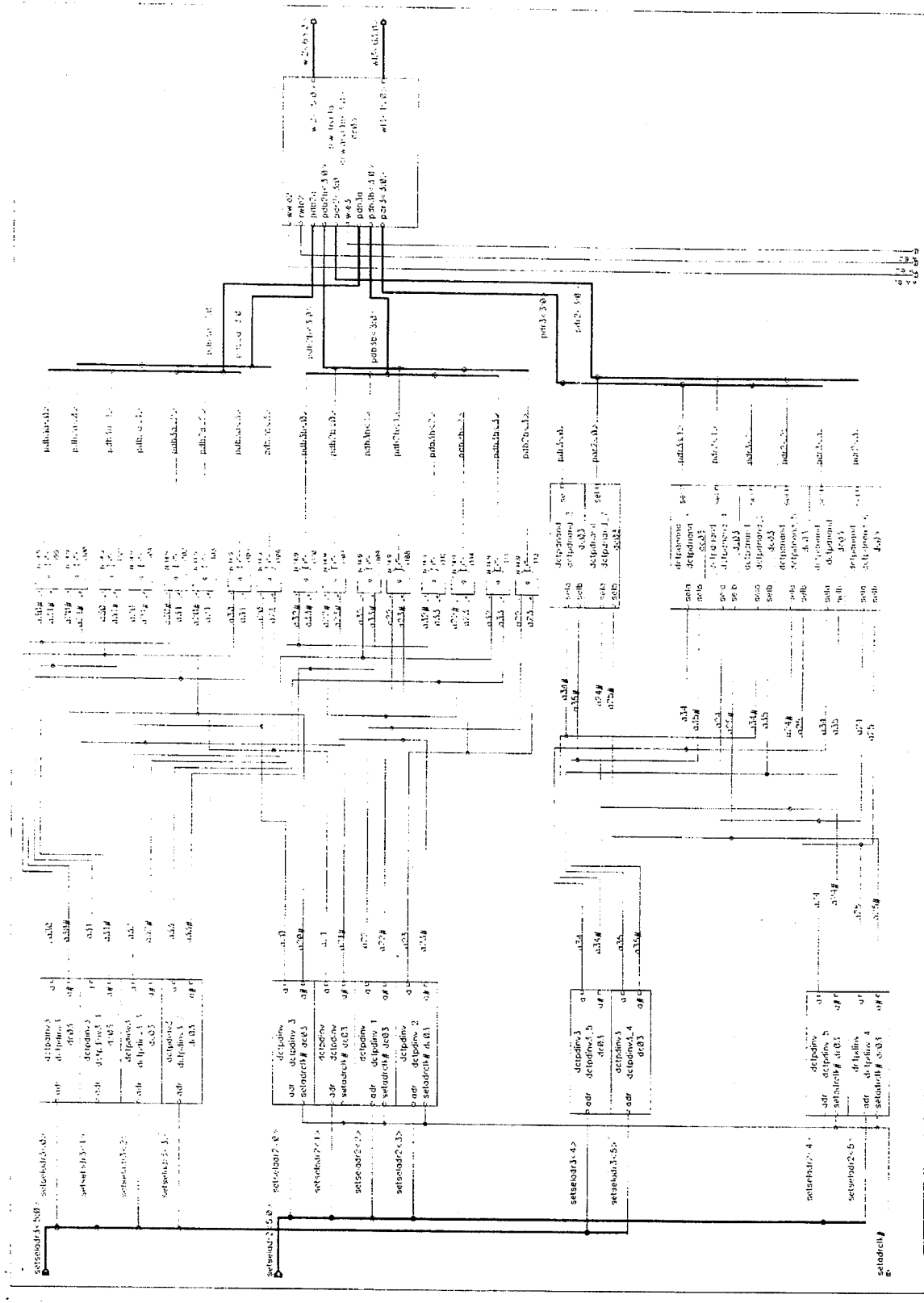

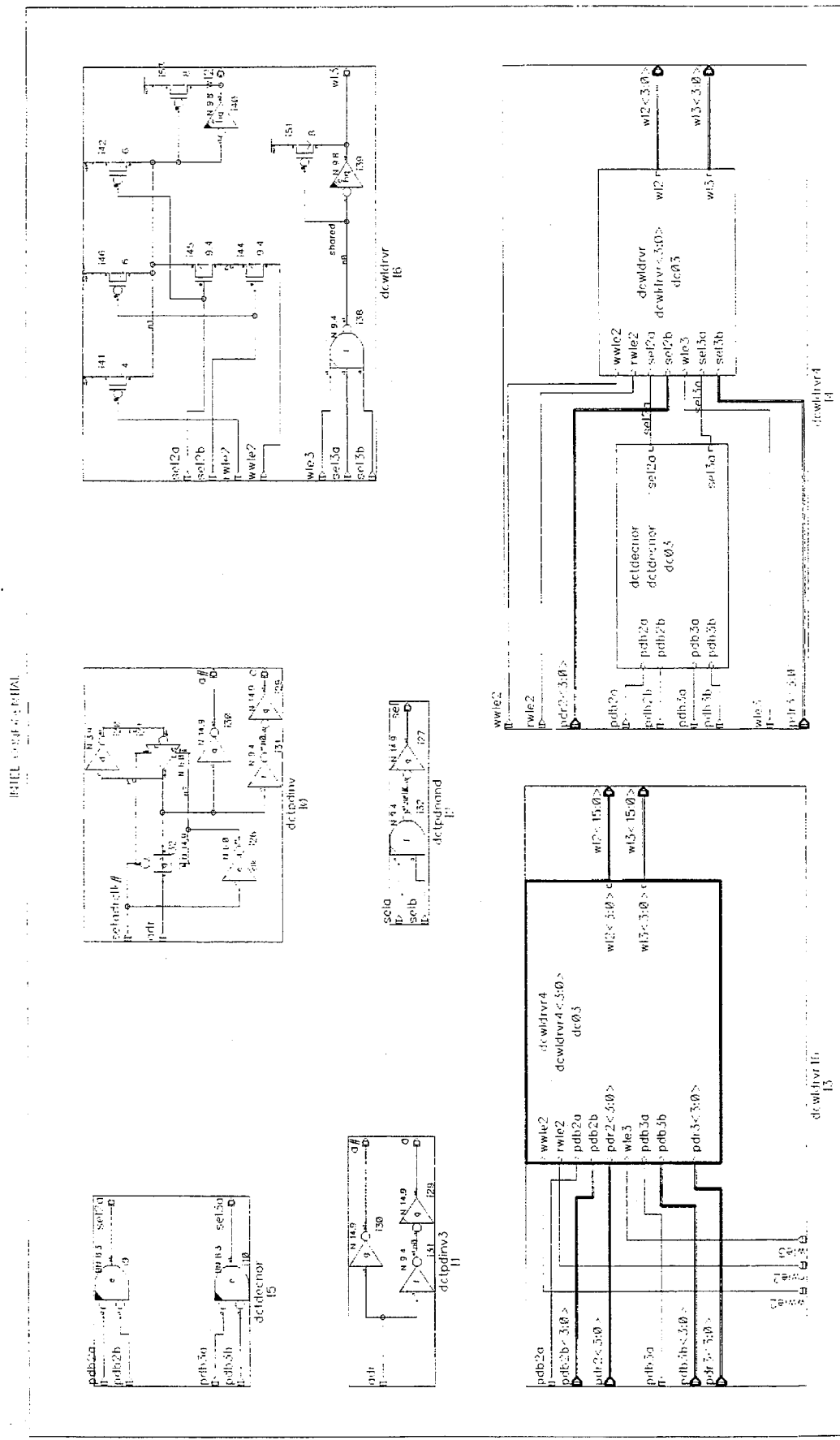

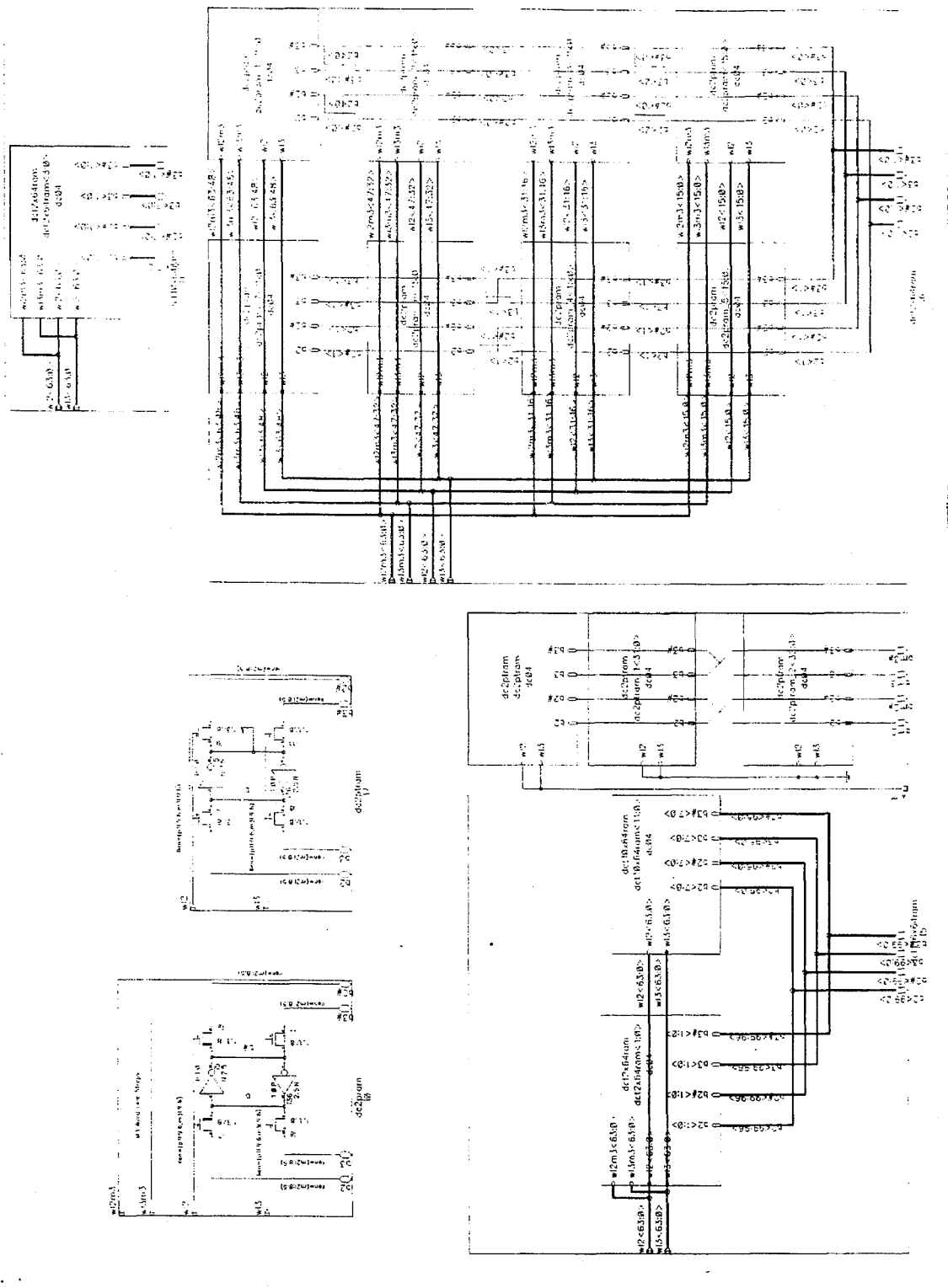

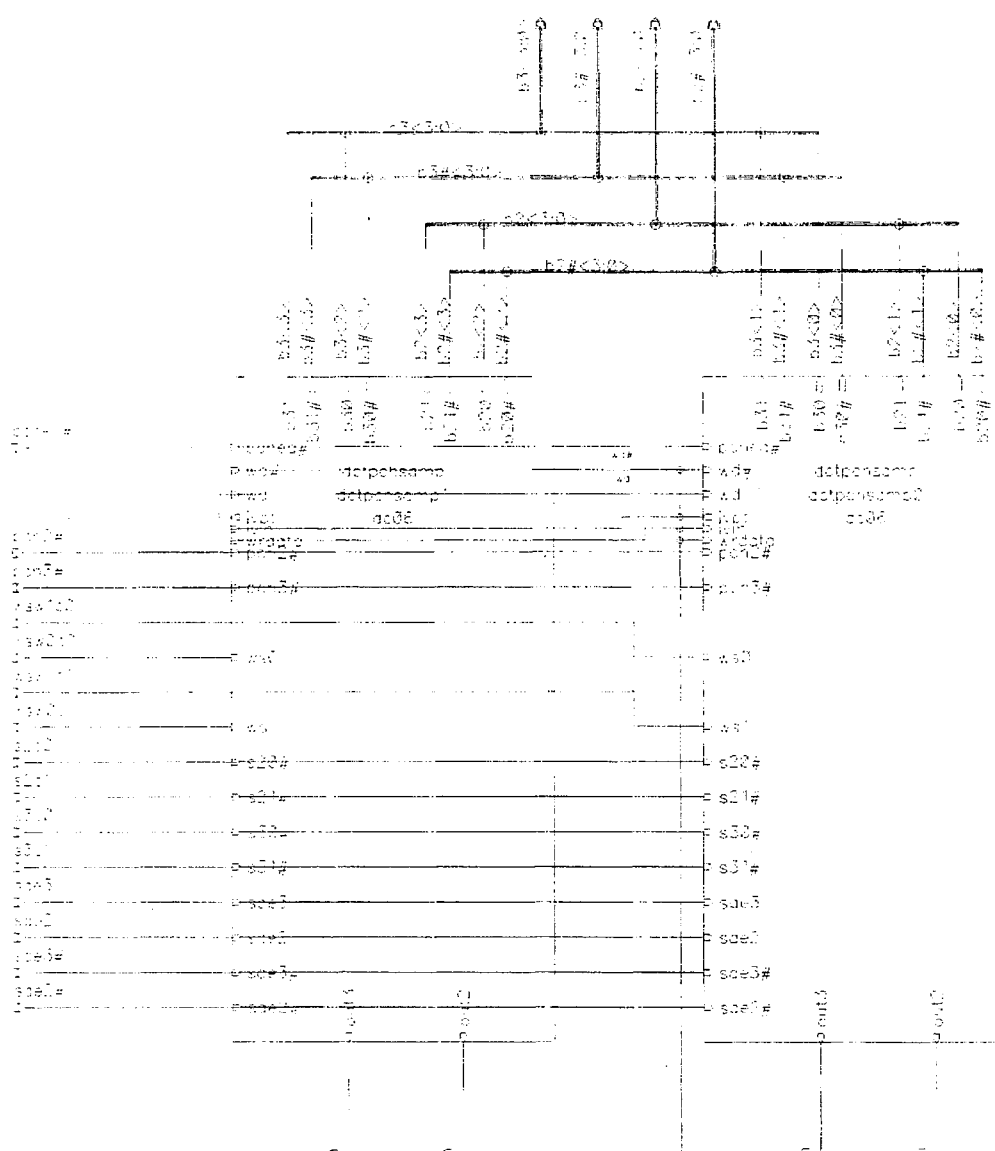

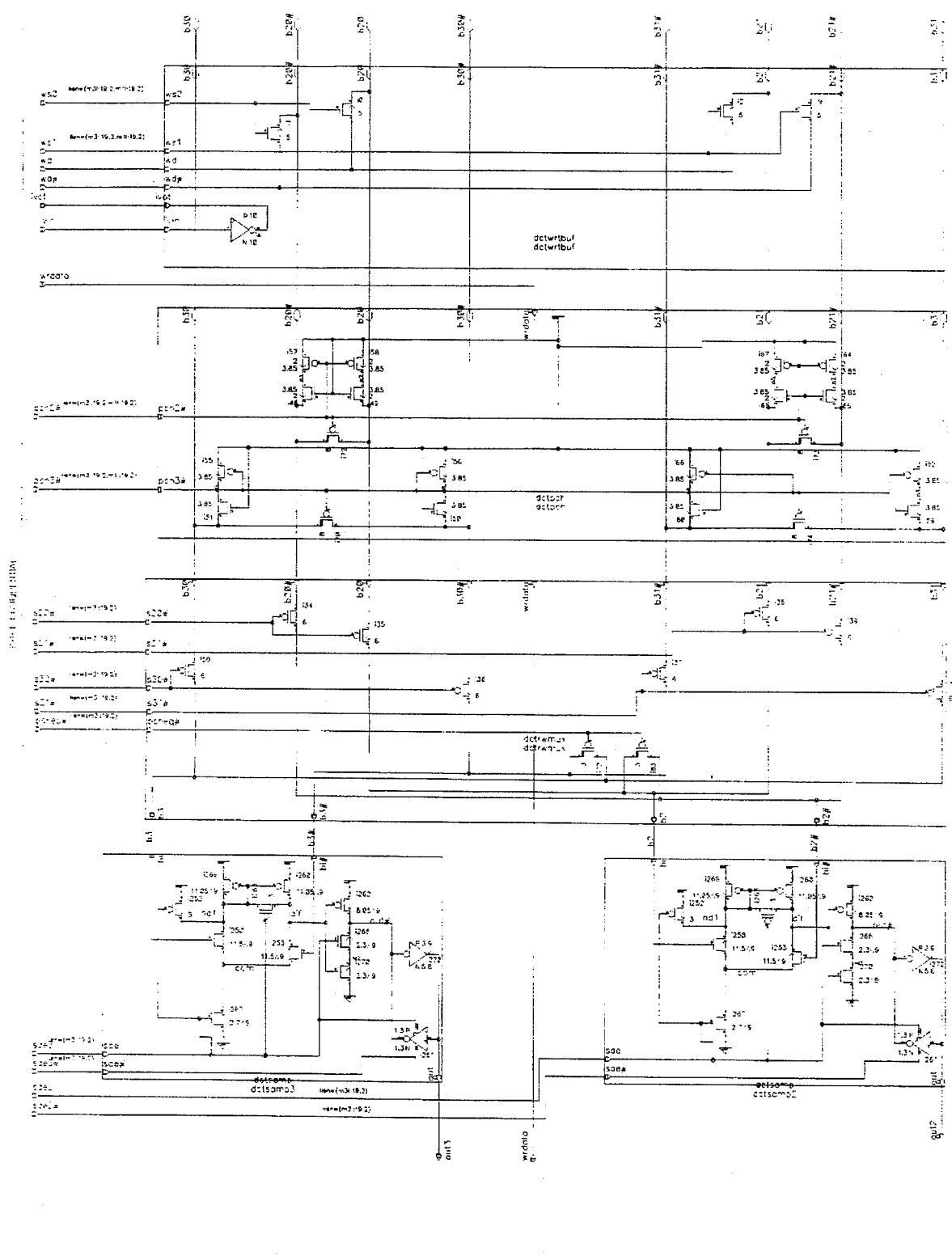

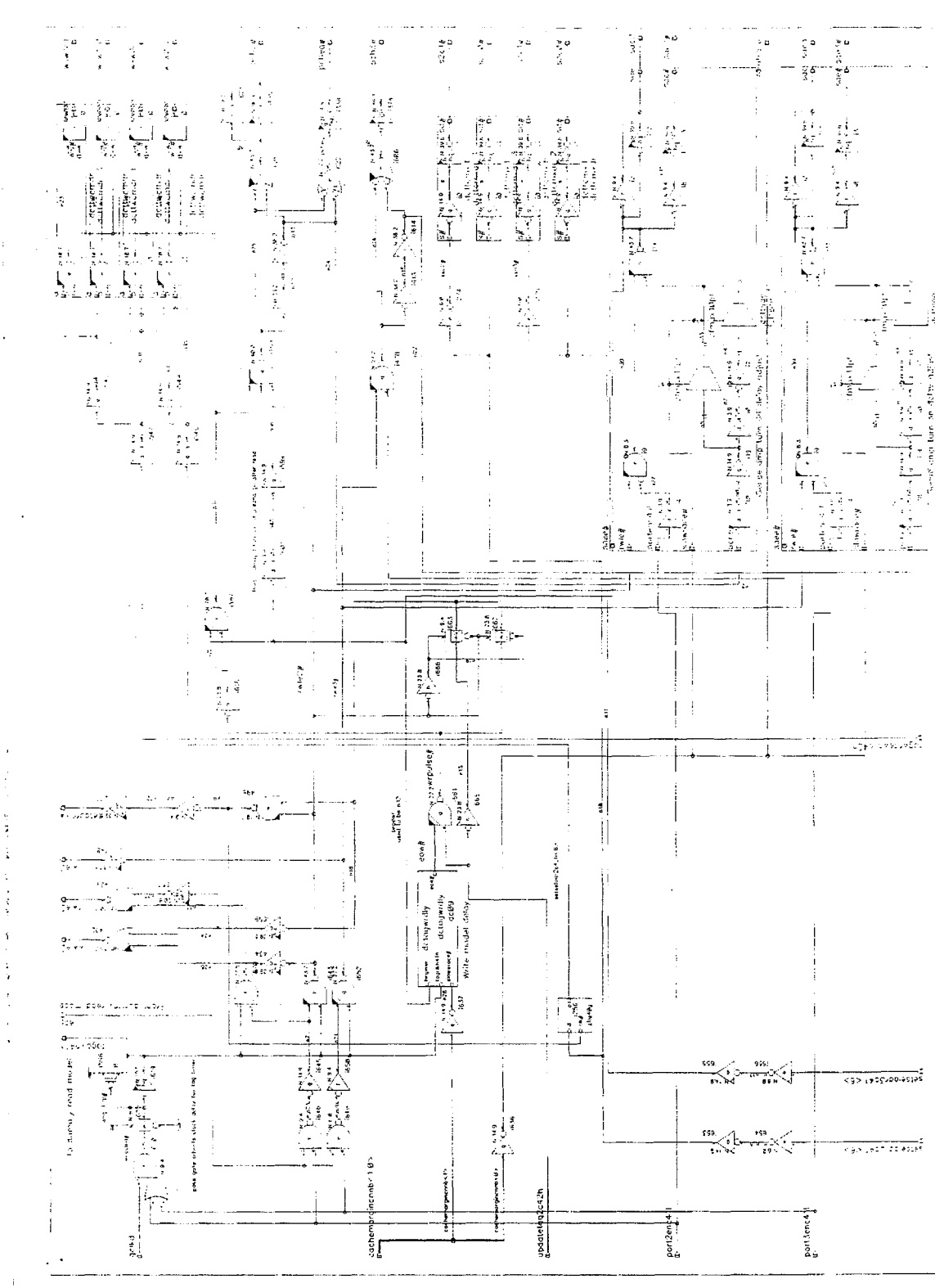

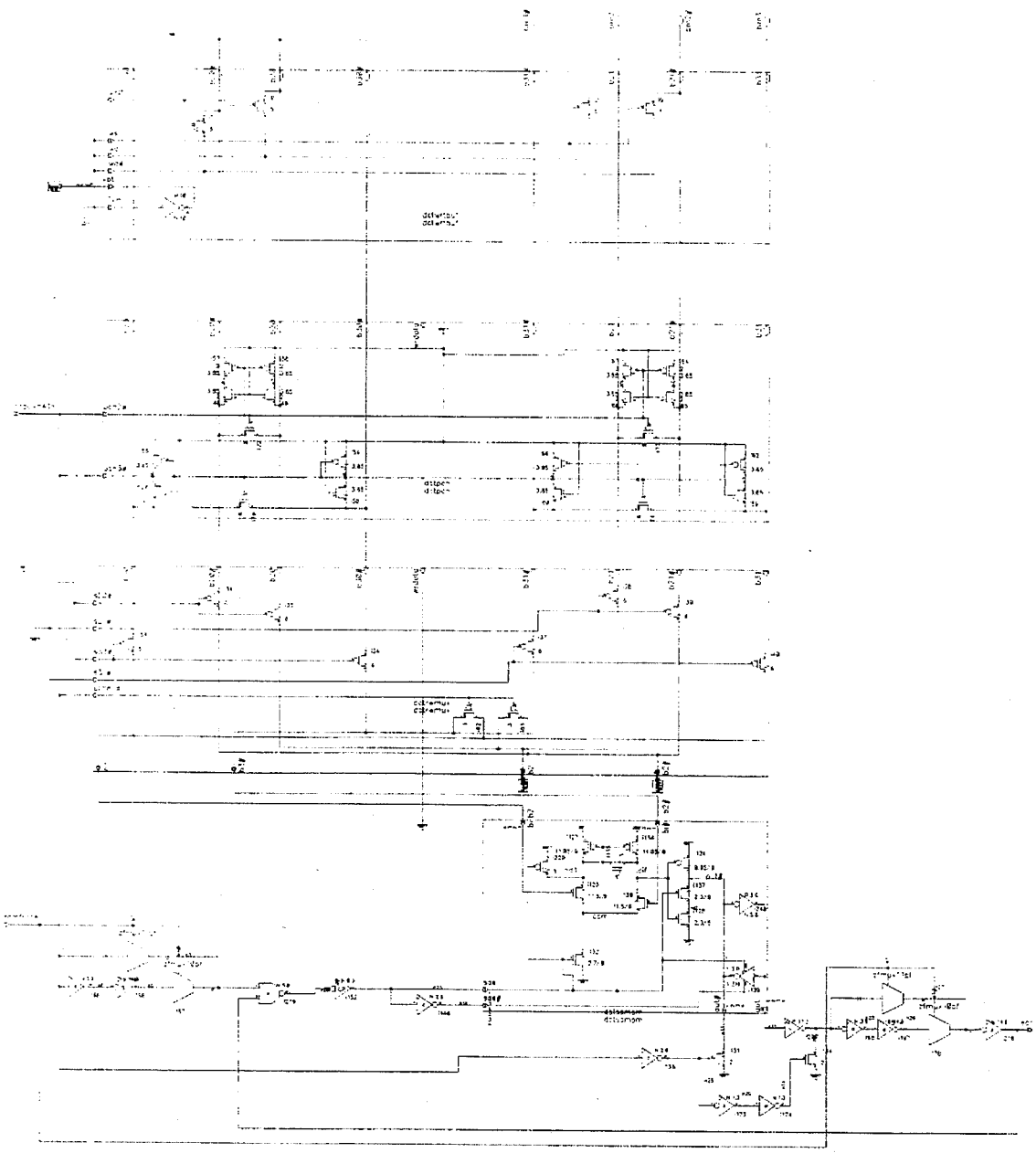

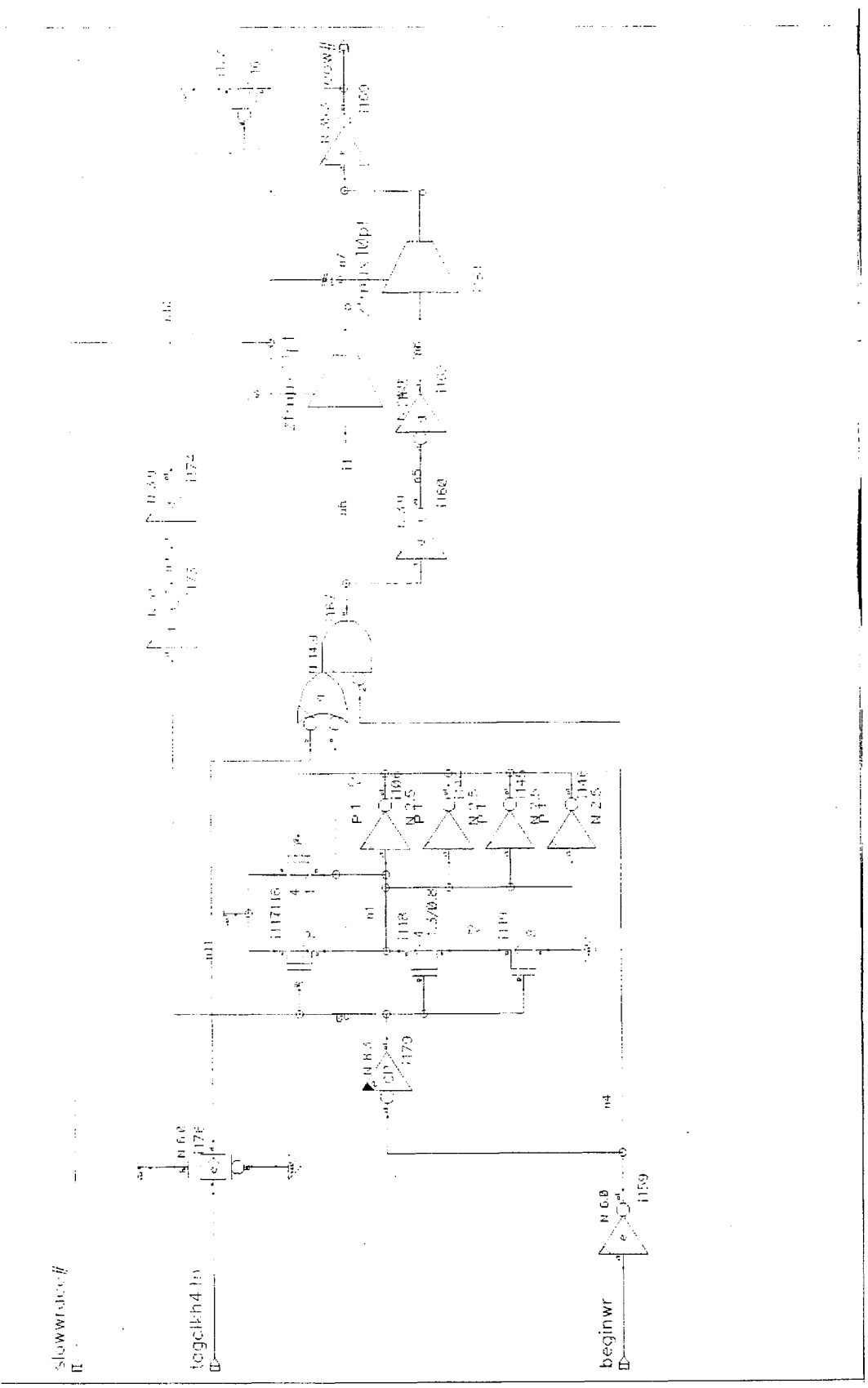

What is claimed is:

1. In a computer processor having a data cache unit with a data cache bank for storing cache lines, a fill buffer for storing data retrieved from an external source in response to a cache miss, and a write-back buffer for storing a victim cache line subject to eviction, wherein the cache unit operates in synchronization with a clock signal having individual clock cycles, a method for replacing a cache line of the cache bank with a line from the fill buffer comprising the steps of:

determining whether an operation from a group comprising lead operations and store operations is pending on any line within the data cache bank and, if said operation is not pending, identifying the victim cache line to be evicted from the cache bank; and transferring, in a single clock cycle, the victim cache line into the write-back buffer, and replacing, in the single clock cycle, the victim cache line with the line from the fill buffer;

if said operation is pending, determining whether the fill buffer is full, and if the fill buffer is full, aborting the pending operation, and, if the fill buffer is not full, waiting for a next available clock cycle when no operation from said group is pending on any of the cache bank cache lines before performing the step of replacing the cache line of the cache bank with the line from the fill buffer.

2. The method of claim 1, wherein the computer processor includes a plurality of data cache units each capable of snooping cache lines of other of said data cache units and wherein the method further includes, after the step of identifying the victim cache line but before the step of transferring the victim cache line into the write-back buffer, the following steps of:

determining whether the victim line is subject to a pending snoop operation, and if the victim line is subject to a pending snoop operation, aborting the steps of replacing the cache line of the cache bank with the line from the fill buffer.

3. In a computer processor having a plurality of data cache units each having a data cache bank for storing cache lines, a fill buffer for storing data retrieved from an external source in response to a cache miss, and a separate write-back buffer for storing a victim cache line subject to eviction, wherein the data cache units operate in synchronization with a clock signal having individual clock cycles, and wherein each of the data cache units is capable of snooping cache lines of other of said data cache units, a method for replacing a cache line of a cache unit's cache bank with a line from the cache unit's fill buffer, said method comprising the steps of:

a) determining whether the cache unit's write back buffer is full and, if so, waiting until the write back buffer is no longer full;

b) determining whether an operation from a group comprising load operations and store operations is pending on any line within the data cache bank and, if said operation is pending, determining whether the fill buffer is full, and if the fill buffer is full, aborting the pending operation and, if the fill buffer is not full, waiting for a next available clock cycle when no operation from said group is pending on any of the cache bank cache lines;

c) identifying the victim cache line to be evicted;

d) determining whether the victim line is subject to a pending snoop operation, and, if so, repeating steps a)–c); and e) transferring, in a single clock cycle, the victim cache line into the write-back buffer, and replacing, in the same single clock cycle, the victim cache line with the line from the fill buffer; and f) evicting the victim cache line from the write-back buffer.

4. In a computer processor having a data cache unit with a data cache bank for storing cache lines, a fill buffer for storing data retrieved from an external source in response to a cache miss, and a separate write-back buffer for storing a victim cache line subject to eviction, wherein the cache unit operates in synchronization with a clock signal having individual clock cycles, an apparatus for replacing a cache line of the cache bank with a line from the fill buffer comprising:

means for identifying the victim cache line to be evicted from the cache bank;

replacement means for transferring, in a single clock cycle, the victim cache line into the write-back buffer, and means for replacing, in the single clock cycle, the victim cache line with the line from the fill buffer;

means for determining whether an operation from a group comprising lead operations and store operations is pending on any line within the data cache bank; if said operation is not pending, for controlling operation of the replacement means to replace the cache line; if said operation is pending, for determining whether the fill buffer is full; if the fill buffer is full, for aborting the pending operation; and, if the fill buffer is not full, for controlling the replacement means to wait for a next available clock cycle when no operation from said group is pending on any of the cache bank cache lines before replacing the cache lines.

5. The apparatus of claim 4, further including means for evicting the victim cache line from the write-back buffer.

6. The apparatus of claim 4, further including:

means for determining whether the write-back buffer is full and;

means, responsive to determination that the write-back buffer is full for aborting operation of the replacement means.

7. The apparatus of claim 4, wherein the computer processor includes a plurality of data cache units each capable of snooping cache lines of other of said data cache units and wherein the apparatus further includes means for determining whether the victim line is subject to a pending snoop operation and, if the victim line is subject to a pending snoop operation, for controlling the replacement means to abort replacing the cache line.

8. In a computer processor having a data cache unit with a data cache bank for storing cache lines, a fill buffer for storing data retrieved from an external source in response to a cache miss, and a separate write-back buffer for storing a victim cache line subject to eviction, wherein the cache unit operates in synchronization with a clock signal having individual clock cycles, an apparatus for replacing a cache line of the cache bank with a line from the fill buffer comprising:

an element for identifying the victim cache line to be evicted from the cache bank;

a replacement element configured for transferring, in a single clock cycle, the victim cache line into the write-back buffer, and replacing, in the single clock cycle, the victim cache line with a line from the fill buffer; and an element for determining whether an operation from a group comprising load operations and store operations is pending on any line within the data cache bank and,
- if said operation is not pending, for controlling operation of the replacement element to replace the cache line, and
- if said operation is pending, for determining whether the fill buffer is full, and
  - if the fill buffer is full, for aborting the pending operation, and,
  - if the fill buffer is not full, for controlling the replacement element to wait for a next available clock cycle when no operation from said group is pending on any of the cache bank cache lines before replacing the cache lines.

9. The apparatus of claim 8, wherein the write-back buffer includes an element for evicting the victim cache line from the write-back buffer.

10. The apparatus of claim 8, further including:
- an element for determining whether the write-back buffer is full and;
- an element, responsive to determination that the write-back buffer is full, for aborting operation of the replacement element.

11. The apparatus of claim 8, wherein the computer processor includes a plurality of data cache units each capable of snooping cache lines of other of said data cache units and wherein the apparatus further includes an element for determining whether the victim line is subject to a pending snoop operation and, if the victim line is subject to a pending snoop operation, for controlling the replacement element to abort replacing the cache line.

12. A computer comprising:
- a plurality of microprocessors each having a data cache unit operating in synchronization with a clock signal having individual clock cycles, each microprocessor capable of snooping the data cache units of each of the other microprocessors;
- a main memory;
- a system bus interconnecting the microprocessors and the main memory; with each of the data cache units including:
  - a data cache bank for storing cache lines;
  - a fill buffer for storing data retrieved from an external source in response to a cache miss;
  - a separate write-back buffer for storing a victim cache line subject to eviction; and
  - elements for:
    - determining whether the write-back buffer is full and, if so, waiting until the write-back buffer is no longer full:
    - determining whether an operation from a group comprising load operations and store operations is pending on any line within the data cache bank and,
      - if said operation is pending, determining whether the fill buffer is full, and
      - if the fill buffer is full, aborting the pending operation and,
      - if the fill buffer is not full, waiting for a next available clock cycle when no operation from said group is pending on any of the cache bank cache lines;
    - identifying the victim cache line to be evicted;
    - determining whether the victim line is subject to a pending snoop operation, and, if so, repeating the determination of whether the write-back buffer is full, the determination of whether an operation from the group comprising load operations and store operations is pending, and the identification of the victim cache line;
    - transferring, in a single clock cycle, the victim cache line into the write-back buffer, and replacing, in the same single clock cycle, the victim cache line with the line from the fill buffer; and
    - evicting the victim cache line from the write-back buffer.

* * * * *

UNITED STATES PATENT AND TRADEMARK OFFICE
CERTIFICATE OF CORRECTION

PATENT NO.    : 5,526,510
DATED         : June 11, 1996
INVENTOR(S)   : Akkary, et al.

It is certified that error appears in the above-identified patent and that said Letters Patent is hereby corrected as shown below:

In column 41 at line 11 delete "lead" and insert --load--

In column 42 at line 27 delete "lead" and insert --load--

In column 44 at line 13 delete ":" after "full" prior to "determining" and insert --;--

Signed and Sealed this

Eleventh Day of February, 1997

Attest:

Attesting Officer

BRUCE LEHMAN

Commissioner of Patents and Trademarks